US012284993B1

(12) United States Patent
Agnew et al.

(10) Patent No.: US 12,284,993 B1
(45) Date of Patent: Apr. 29, 2025

(54) FISHING LURE WITH ROTATABLE PORTION

(71) Applicant: Angler Junction, LLC, West Lafayette, IN (US)

(72) Inventors: Charles W. Agnew, West Lafayette, IN (US); Carl R. Agnew, West Lafayette, IN (US)

(73) Assignee: Angler Junction, LLC, West Lafayette, IN (US)

( * ) Notice: Subject to any disclaimer, the term of this patent is extended or adjusted under 35 U.S.C. 154(b) by 0 days.

(21) Appl. No.: 18/235,672

(22) Filed: Aug. 18, 2023

Related U.S. Application Data

(60) Provisional application No. 63/460,991, filed on Apr. 21, 2023, provisional application No. 63/399,072, filed on Aug. 18, 2022.

(51) Int. Cl.
*A01K 85/02* (2006.01)
*A01K 85/00* (2006.01)
(Continued)

(52) U.S. Cl.
CPC .......... *A01K 85/023* (2022.02); *A01K 85/017* (2022.02); *A01K 85/02* (2013.01);
(Continued)

(58) Field of Classification Search
CPC .... A01K 85/017; A01K 85/02; A01K 85/021; A01K 85/022; A01K 85/023;
(Continued)

(56) References Cited

U.S. PATENT DOCUMENTS

| 536,185 | A | * | 3/1895 | Cook | ..................... A01K 85/12 |
| | | | | | 416/196 R |
| 644,911 | A | | 3/1900 | Hedgeland | |

(Continued)

FOREIGN PATENT DOCUMENTS

| CH | 117502 A | * | 11/1926 |
| CH | 131972 A | * | 3/1929 |

(Continued)

OTHER PUBLICATIONS

Tough Lures, Morrison Bait Co Darby Weedless Bait in Box, Retrieved from Internet on Jan. 4, 2023, from URL, https://toughlures.com/products/morrison-bait-co-darby-weedless-bait-in-box.

*Primary Examiner* — Darren W Ark
(74) *Attorney, Agent, or Firm* — MacMillan, Sobanski & Todd, LLC

(57) ABSTRACT

A fishing lure includes a body portion, a hook member coupled to a junction region disposed distal of the body portion, and a shielding skirt extending from the body member. The body portion includes a rotatable member configured to rotate about a central longitudinal axis in the presence of fluid friction acting against the lure. The shielding skirt extends outward from the body portion and is configured to assume a first configuration during retrieval of the lure that defines a protective zone that protects the hook member from ensnaring structures, such as submerged vegetation. The shielding skirt is collapsible by contacting lateral forces into a second configuration in which one or more terminal endpoints of the hook member is exposed and available to ensnare the source of the contacting lateral force, such as a fish. The shielding skirt resiliently returns to the first configuration when the lateral forces are removed.

19 Claims, 10 Drawing Sheets

(51) Int. Cl.
*A01K 85/01* (2006.01)
*A01K 85/12* (2006.01)
(52) U.S. Cl.
CPC ............ *A01K 85/021* (2022.02); *A01K 85/12* (2013.01); *A01K 85/122* (2022.02); *A01K 85/128* (2022.02); *A01K 85/1821* (2022.02); *A01K 85/1851* (2022.02); *A01K 85/1881* (2022.02); *A01K 85/1883* (2022.02)
(58) Field of Classification Search
CPC .... A01K 85/024; A01K 85/025; A01K 85/10; A01K 85/12; A01K 85/128; A01K 85/143; A01K 85/18; A01K 85/1811; A01K 85/1821; A01K 85/1851; A01K 85/1871; A01K 85/1877; A01K 85/1881; A01K 85/1883; A01K 84/1887; A01K 91/053
USPC ........... 43/42.11, 42.13, 42.14, 42.15, 42.16, 43/42.2, 42.21, 42.28, 42.31, 42.36, 42.1, 43/42.41, 42.42, 42.43, 42.74
See application file for complete search history.

(56) References Cited

U.S. PATENT DOCUMENTS

| | | | | |
|---|---|---|---|---|
| 699,711 A * | 5/1902 | Pyott, Jr. | ................ | A01K 85/00 43/42.4 |
| 830,404 A | 9/1906 | Barnes | | |
| 981,454 A * | 1/1911 | Ball | ................ | A01K 85/02 43/42.39 |
| 1,069,093 A * | 7/1913 | Faught | ................ | A01K 85/00 D22/128 |
| 1,352,979 A * | 9/1920 | Lawrence | ................ | A01K 91/053 43/42.74 |
| 1,495,832 A * | 5/1924 | Aiken | ................ | A01K 85/16 43/42.47 |
| 1,554,940 A * | 9/1925 | Young | ................ | A01K 85/02 43/42.43 |
| 1,609,209 A * | 11/1926 | Schnell | ................ | A01K 83/06 43/42.43 |
| 1,682,710 A * | 8/1928 | Pflueger | ................ | A01K 85/10 43/44.8 |
| 1,725,636 A * | 8/1929 | Heaslip | ................ | A01K 85/12 43/42.32 |
| 1,726,502 A * | 8/1929 | Pflueger | ................ | A01K 85/02 43/42.16 |
| 1,768,033 A * | 6/1930 | Deatz | ................ | A01K 85/10 43/42.4 |
| 1,803,777 A * | 5/1931 | Speich | ................ | A01K 85/02 43/42.46 |
| 1,884,053 A * | 10/1932 | Mcgarraugh | .......... | A01K 85/00 43/42.28 |
| 1,923,840 A * | 8/1933 | Ozburn | ................ | A01K 85/16 43/42.13 |
| 2,036,954 A * | 4/1936 | Murray | ................ | A01K 85/10 43/42.4 |
| 2,111,020 A * | 3/1938 | Arbogast | ................ | A01K 85/02 43/42.4 |
| 2,125,030 A * | 7/1938 | Ozburn | ................ | A01K 85/16 43/42.4 |
| 2,157,414 A * | 5/1939 | Johnson | ................ | A01K 85/02 43/42.43 |
| 2,161,094 A * | 6/1939 | Saunders, Jr. | .......... | A01K 85/16 43/42.39 |
| 2,168,894 A * | 8/1939 | Arbogast | ................ | A01K 85/14 43/42.49 |
| 2,184,330 A * | 12/1939 | Arbogast | ................ | A01K 85/02 43/42.4 |
| 2,185,668 A * | 1/1940 | Hurdle | ................ | A01K 85/00 43/42.28 |
| D120,988 S * | 6/1940 | Curtis | ................ | D22/128 |
| 2,219,225 A * | 10/1940 | Gambill | ................ | A01K 85/10 43/42.4 |
| 2,266,234 A * | 12/1941 | Mitchell | ................ | A01K 85/12 43/42.13 |
| 2,268,541 A * | 1/1942 | Arbogast | ................ | A01K 85/16 43/42.28 |
| 2,295,375 A * | 9/1942 | Adam | ................ | A01K 83/00 43/42.4 |
| 2,307,478 A * | 1/1943 | Adam | ................ | A01K 85/00 43/42.28 |
| 2,332,400 A * | 10/1943 | Richardson | ............ | A01K 85/02 43/42.43 |
| 2,471,499 A * | 5/1949 | Shipman | ................ | A01K 85/00 D22/128 |
| 2,473,564 A * | 6/1949 | Bergren | ................ | A01K 83/00 43/43.2 |
| 2,476,733 A * | 7/1949 | Jacobs | ................ | A01K 85/02 43/42.25 |
| 2,501,723 A * | 3/1950 | Harvey | ................ | A01K 85/16 43/42.28 |
| 2,569,057 A | 9/1951 | Hinerman | | |
| 2,574,293 A | 11/1951 | Sabin et al. | | |
| 2,603,022 A | 7/1952 | Craig | | |
| 2,630,649 A * | 3/1953 | Arbogast | ................ | A01K 85/14 43/42.3 |
| 2,686,382 A * | 8/1954 | Fisher | ................ | A01K 85/00 43/42.28 |
| 2,750,702 A * | 6/1956 | Hartig | ................ | A01K 85/10 D22/128 |
| 2,753,651 A * | 7/1956 | Fisher | ................ | A01K 97/045 264/78 |
| 2,787,859 A * | 4/1957 | Bay | ................ | A01K 85/00 43/42.4 |
| 2,811,804 A * | 11/1957 | Heath | ................ | A01K 83/00 206/315.11 |
| 2,829,462 A * | 4/1958 | Stokes | ................ | A01K 85/16 D22/129 |
| 2,835,068 A * | 5/1958 | Latham | ................ | A01K 85/16 43/42.31 |
| 2,851,815 A * | 9/1958 | Warner | ................ | A01K 85/14 D22/128 |
| 2,857,703 A * | 10/1958 | Parmlee | ................ | A01K 83/06 43/42.28 |
| 2,911,751 A | 11/1959 | Mason | | |
| 2,917,859 A * | 12/1959 | Troyer | ................ | A01K 85/12 D22/129 |
| 3,012,358 A * | 12/1961 | Multanen | ................ | A01K 85/12 43/42.31 |
| 3,060,620 A * | 10/1962 | Binkowski | ............ | A01K 85/02 43/42.24 |
| 3,494,063 A * | 2/1970 | Treaster | ................ | A01K 85/12 43/42.31 |
| 3,533,183 A * | 10/1970 | Treaster | ................ | A01K 85/12 43/42.32 |
| 3,740,889 A * | 6/1973 | Scott | ................ | A01K 85/00 43/42.36 |
| 3,750,325 A * | 8/1973 | Feltman | ................ | A01K 85/00 D22/129 |
| 3,803,747 A * | 4/1974 | Cartwright | ............ | A01K 85/00 43/44.81 |
| 3,858,343 A * | 1/1975 | Goforth | ................ | A01K 85/10 43/43.4 |
| 3,885,339 A | 5/1975 | Herkner | | |
| 3,996,688 A * | 12/1976 | Hardwicke, III | ....... | A01K 85/00 43/42.11 |
| 4,037,345 A * | 7/1977 | Dubois | ................ | A01K 85/00 43/42.4 |
| 4,037,346 A * | 7/1977 | Holst | ................ | A01K 85/12 43/42.14 |
| 4,335,495 A * | 6/1982 | Buchanan | ............ | A01K 85/00 264/306 |
| 4,416,080 A * | 11/1983 | Morrissette | ............ | A01K 85/12 43/42.46 |
| 4,744,167 A * | 5/1988 | Steele | ................ | A01K 85/02 43/44.99 |

(56) References Cited

U.S. PATENT DOCUMENTS

| | | | | |
|---|---|---|---|---|
| 4,751,789 A * | 6/1988 | Devereaux | A01K 85/00 43/42.39 |
| 4,763,436 A * | 8/1988 | Lindmeyer | A01K 85/02 43/42.4 |
| 4,884,358 A * | 12/1989 | Grove | A01K 85/00 43/42.13 |
| 4,914,851 A * | 4/1990 | Acker | A01K 85/02 43/42.1 |
| 4,920,688 A * | 5/1990 | Devereaux | A01K 85/00 43/42.39 |
| 5,031,350 A * | 7/1991 | Rabideau | A01K 85/02 43/43.4 |
| 5,138,789 A * | 8/1992 | Hood | A01K 85/10 43/42.19 |
| 5,167,089 A * | 12/1992 | Schriefer | A01K 85/00 43/42.36 |
| 5,175,955 A * | 1/1993 | Wilson | A01K 85/00 43/42.39 |
| 5,201,859 A * | 4/1993 | Rosek | A01K 85/12 43/42.11 |
| 5,327,670 A * | 7/1994 | Tallerico | A01K 85/10 43/42.34 |
| 5,327,671 A * | 7/1994 | Rosek | A01K 85/12 43/42.19 |
| 5,412,900 A * | 5/1995 | Rosek | A01K 85/12 43/42.19 |
| 5,577,340 A * | 11/1996 | Murphy | A01K 85/02 43/43.2 |
| 5,588,247 A * | 12/1996 | Wicht | A01K 85/00 43/42.31 |
| 6,176,035 B1 * | 1/2001 | Somogyi | A01K 85/12 43/42.31 |
| 6,205,697 B1 * | 3/2001 | Kent | A01K 85/01 264/246 |
| 6,266,914 B1 * | 7/2001 | Johnson | A01K 85/00 43/42.13 |
| 6,598,336 B2 * | 7/2003 | Link | A01K 85/00 43/42.38 |
| 6,993,866 B1 * | 2/2006 | Strange | A01K 85/12 43/42.31 |
| 7,010,881 B2 * | 3/2006 | Altman | A01K 85/12 43/42.13 |
| 7,234,267 B1 * | 6/2007 | Konstant | A01K 85/02 43/42.24 |
| 7,284,348 B1 * | 10/2007 | Nugent | A01K 85/16 43/42.24 |
| 7,360,335 B2 * | 4/2008 | Edwards | A01K 85/10 43/42.28 |
| 7,467,491 B1 * | 12/2008 | Slocum | A01K 85/10 43/42.13 |
| 8,196,336 B2 * | 6/2012 | Nicholson, III | A01K 85/00 43/42.24 |
| D668,735 S * | 10/2012 | Steckelberg | D22/129 |
| 8,402,687 B1 * | 3/2013 | Jarrell | A01K 85/00 43/42.28 |
| 8,484,884 B2 * | 7/2013 | Zuk | A01K 85/16 43/42.28 |
| D707,326 S * | 6/2014 | Moehring | D22/129 |
| 8,978,289 B2 * | 3/2015 | Willis | A01K 85/00 43/42.31 |
| 9,521,832 B1 * | 12/2016 | Pack | A01K 83/06 |
| 9,591,840 B2 * | 3/2017 | LeHew | A01K 85/18 |
| 10,130,082 B2 * | 11/2018 | Hunter | A01K 97/00 |
| D837,339 S * | 1/2019 | Sandefur | D22/129 |
| 10,531,649 B2 * | 1/2020 | VanZant | A01K 85/10 |
| D983,929 S * | 4/2023 | Nelson | D22/128 |
| 11,793,181 B1 * | 10/2023 | Smith | A01K 85/18 |
| 11,871,738 B2 * | 1/2024 | DeHerrera | A01K 85/16 |
| 2001/0047608 A1 * | 12/2001 | Cox | A01K 85/12 43/42.19 |
| 2002/0073607 A1 * | 6/2002 | Hickok | A01K 85/00 43/42.28 |
| 2002/0148155 A1 * | 10/2002 | Pasley | A01K 85/10 43/42.49 |
| 2002/0157300 A1 * | 10/2002 | Saul | A01K 85/00 43/42.33 |
| 2003/0046858 A1 * | 3/2003 | Meraw | A01K 85/16 43/42.28 |
| 2003/0074828 A1 * | 4/2003 | Sprouse | A01K 85/10 43/42.13 |
| 2003/0145510 A1 * | 8/2003 | Kohigashi | A01K 85/00 43/42.13 |
| 2004/0006908 A1 * | 1/2004 | Essad | A01K 85/00 43/42.13 |
| 2004/0123510 A1 * | 7/2004 | Essad | A01K 85/00 43/42.13 |
| 2005/0229473 A1 * | 10/2005 | Altman | A01K 85/12 43/42.11 |
| 2007/0277423 A1 * | 12/2007 | Edwards | A01K 85/10 43/42.11 |
| 2009/0172993 A1 * | 7/2009 | Willis | A01K 85/00 43/42.31 |
| 2009/0211144 A1 * | 8/2009 | Murphy | A01K 85/10 43/42.15 |
| 2011/0035987 A1 * | 2/2011 | Nicholson, III | A01K 85/00 43/42.4 |
| 2012/0055071 A1 * | 3/2012 | Westin | A01K 91/053 43/42.49 |
| 2012/0073182 A1 * | 3/2012 | Poss | A01K 85/00 43/42.26 |
| 2013/0247445 A1 * | 9/2013 | Autrey | A01K 85/12 43/42.21 |
| 2014/0311011 A1 * | 10/2014 | Guntharp | A01K 85/12 43/42.2 |
| 2015/0096220 A1 * | 4/2015 | Buhler | A01K 85/00 43/42.11 |
| 2015/0181846 A1 * | 7/2015 | Taboada | A01K 91/08 43/4.5 |
| 2016/0015013 A1 * | 1/2016 | Talbot | A01K 85/01 43/42.19 |
| 2016/0057983 A1 * | 3/2016 | Furuya | A01K 85/12 43/4 |
| 2016/0165868 A1 * | 6/2016 | LeHew | A01K 85/00 43/42.74 |
| 2016/0205908 A1 * | 7/2016 | Stanford | A01K 83/00 |
| 2016/0235047 A1 * | 8/2016 | Mirabal | A01K 85/01 |
| 2017/0042134 A1 * | 2/2017 | Sandefur | A01K 85/10 |
| 2017/0231207 A1 * | 8/2017 | Tarazona Sicilia | A01K 85/02 43/42.09 |
| 2017/0347635 A1 * | 12/2017 | Sandefur | A01K 85/02 |
| 2018/0168136 A1 * | 6/2018 | Sano | A01K 85/02 |
| 2019/0297864 A1 * | 10/2019 | League | A01K 83/06 |
| 2020/0352147 A1 * | 11/2020 | Kendra | A01K 85/1883 |
| 2021/0000094 A1 * | 1/2021 | Dunbar | A01K 85/10 |
| 2022/0007624 A1 * | 1/2022 | Winfrey | A01K 83/00 |
| 2023/0049724 A1 * | 2/2023 | Fox | A01K 91/04 |
| 2023/0148577 A1 * | 5/2023 | Nelson | A01K 85/1847 43/17.6 |
| 2023/0263145 A1 * | 8/2023 | Fox | A01K 85/024 43/42.36 |
| 2024/0156074 A1 * | 5/2024 | Daniels | A01K 85/02 |

FOREIGN PATENT DOCUMENTS

| | | | | |
|---|---|---|---|---|
| DE | 498652 | C * | 5/1930 | |
| DE | 522716 | C * | 4/1931 | |
| DE | 1657098 | A1 * | 1/1971 | |
| DE | 29605471 | U1 * | 7/1996 | A01K 85/12 |
| DE | 102017123547 | B3 * | 2/2019 | |
| EP | 0653155 | A1 * | 5/1995 | |
| EP | 2989895 | A1 * | 3/2016 | A01K 85/12 |
| FR | 736437 | A * | 11/1932 | |
| FR | 748370 | A * | 7/1933 | |
| FR | 806162 | A * | 12/1936 | |
| FR | 833402 | A * | 10/1938 | |
| FR | 875526 | A * | 9/1942 | |
| FR | 904708 | A * | 11/1945 | |
| FR | 937342 | A * | 8/1948 | |
| FR | 1036980 | A * | 9/1953 | |

(56) References Cited

FOREIGN PATENT DOCUMENTS

| FR | 1248602 | A | * | 12/1960 | |
|----|---------|---|---|---------|---|
| FR | 1295573 | A | * | 6/1962 | |
| FR | 1544293 | A | * | 10/1968 | |
| JP | 3190053 | U | * | 4/2014 | |
| JP | 2014083050 | A | * | 5/2014 | |
| JP | 2016086808 | A | * | 5/2016 | ............ A01K 85/00 |
| JP | 2016101144 | A | * | 6/2016 | |
| JP | 2016214200 | A | * | 12/2016 | |
| JP | 2017212969 | A | * | 12/2017 | |
| JP | 2019115286 | A | * | 7/2019 | |
| JP | 2020043849 | A | | 3/2020 | |
| KR | 20130110334 | A | * | 10/2013 | |
| RU | 2059363 | C1 | * | 5/1996 | |
| WO | WO-9957972 | A1 | * | 11/1999 | ............ A01K 85/12 |
| WO | WO-2008005221 | A1 | * | 1/2008 | ............ A01K 85/01 |
| WO | WO-2015192190 | A1 | * | 12/2015 | ............ A01K 85/00 |
| WO | WO-2018165506 | A1 | * | 9/2018 | ............ A01K 85/12 |
| WO | WO-2019233115 | A1 | * | 12/2019 | ............ A01K 83/00 |

* cited by examiner

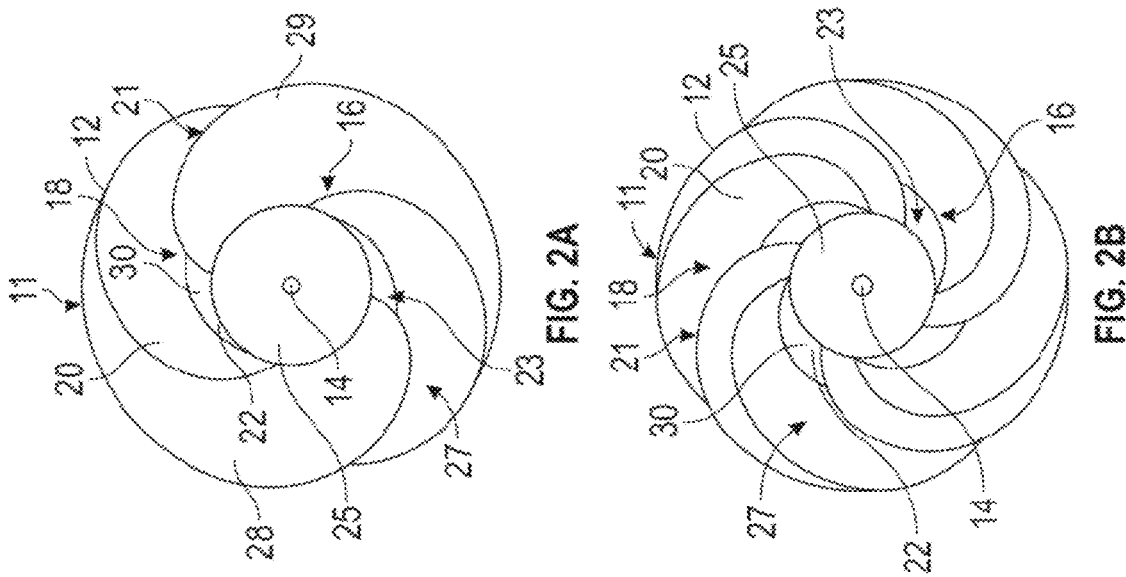
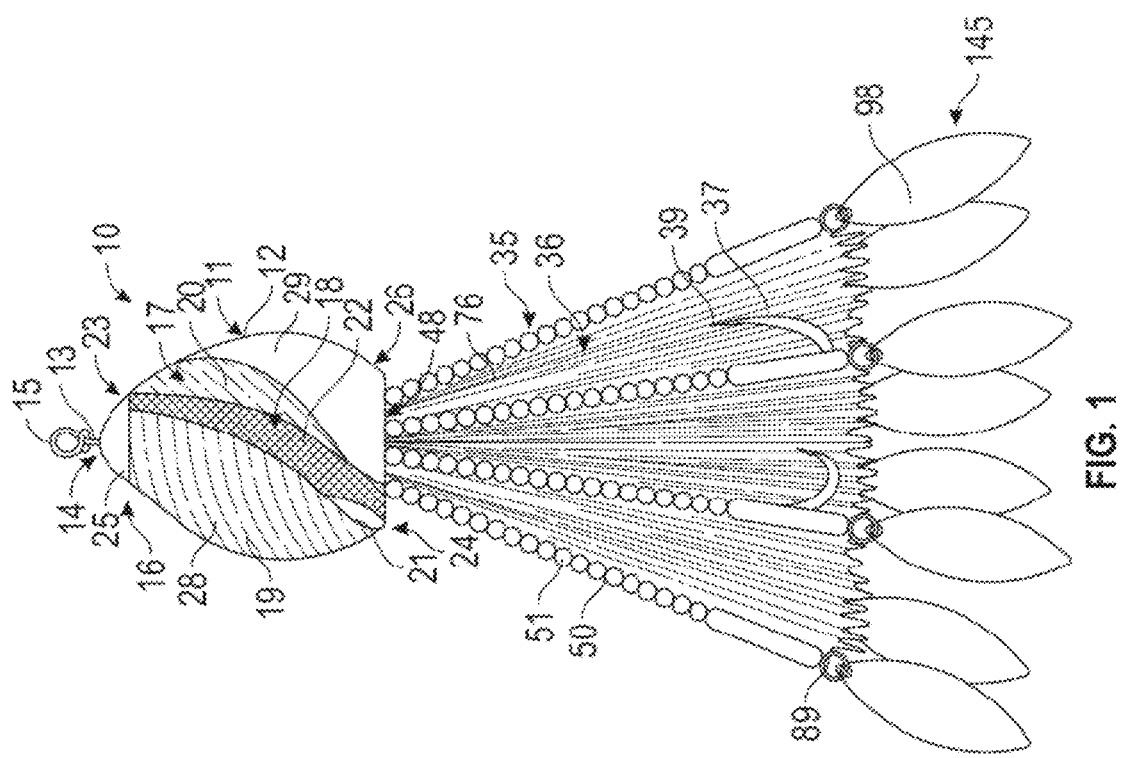

FISHING LURE WITH ROTATABLE PORTION

CROSS-REFERENCE TO RELATED APPLICATIONS

This application claims the benefit of U.S. Provisional Patent Application No. 63/399,072, filed on Aug. 18, 2022, and U.S. Provisional Patent Application No. 63/460,991, filed on Apr. 21, 2023. Each of these related applications is incorporated by reference into this disclosure in its entirety.

FIELD

The disclosure relates generally to the field of fishing equipment. More particularly, the disclosure relates to artificial fishing lures.

BACKGROUND

Designers of artificial fishing lures must consider many performance factors. Among them is the 'action' of the lure and other attributes that enhance its attractiveness to target fish species, as well as the ability of the lure to be used successfully within a particular fishing environment. Various embodiments of the present invention are intended to address these design considerations. Fishing in bodies of water thick with aquatic vegetation and other submerged structure can be particularly challenging in that the hooks need to be able to be sufficiently exposed to ensnare a fish attacking the lure, yet that necessity often results in increasing the likelihood of ensnaring vegetation or other structure during lure retrieval. Flexible guards have been mounted about the hook tip with the intention of deflecting weeds and structure, but typically have only limited effectiveness and can make penetration of the hook into the fish more difficult, sometimes resulting in an unsuccessful hook set. An additional challenge in fishing in an environment with submerged or emergent vegetation is that the body of the lure itself or attached structure, especially a forward-extending lip, can contact and become entangled with vegetation or structure as the lure is retrieved. Some lures are designed to be retrieved on the surface or via a shallow trajectory above the weed tops, but this can limit exposure to deeper-dwelling fish that utilize the vegetation and submergent structure cover.

A need exists, therefore, for new strategies and lure designs that better balance the ability of the lure to ensnare an attacking fish with the need to provide cleaner passage of the lure through underwater structure, while still maintaining a high level of visual attractiveness to fish within different depths and aquatic environments.

BRIEF DESCRIPTION OF THE DRAWINGS

FIG. 1 is a side view of an exemplary embodiment of the fishing lure.

FIG. 2*a* is top view of the rotatable member of FIG. 1.

FIG. 2*b* is a top of another example of a rotatable member.

DETAILED DESCRIPTION OF SELECTED EXAMPLES

The following detailed description and the appended drawings describe and illustrate various example fishing lures. The description and illustration of these examples are provided to enable one skilled in the art to make and use a fishing lure according to an embodiment of the invention. They are not intended to limit the scope of the invention, or the protection sought, in any manner. The invention is capable of being practiced or carried out in various ways; the examples described and illustrated herein are merely selected examples of these various ways and are not considered exhaustive.

As used herein, the term 'proximal' refers to being oriented toward the first, nose end of the fishing lure, while 'distal' refers to being oriented toward the second end of the lure at the location of the hook member or any structures trailing therefrom. In reference to the illustrative embodiments, the term "axial member" refers to a solid, elongate member that extends longitudinal through the rotatable member, which rotates thereabout. The term "body portion" refers to the main, proximal portion of the fishing lure and which generally excludes hook elements, skirts, and structures attached thereto. The term 'rotatable member' refers to one or more elements of the lure body portion that are configured to rotate about the central longitudinal axis of the fishing lure in the presence of fluid friction during retrieval of the lure. The term "shielding skirt" refers to the flexible portion of the fishing lure that extends outward in a first, expanded configuration with inherent rigidity and flexibility to effectively redirect the lure away from underwater structure (or deflect the underwater structure), such as vegetation, to help protect the hooks of the lure from becoming ensnared thereby while having sufficient inward collapsibility to expose the hooks to an attacking predator, while resiliently returning to the first configuration when the collapsing forces are removed. While the shielding skirt of the present invention can provide improved protection against unwanted snagging of underwater structure over skirting which is most commonly used, such as soft plastic skirting (e.g., silicone, mylar, etc.) or hair (e.g., 'bucktails'), it is not necessarily effective in guarding the hook. Its effectiveness depends on the degree of the contacting forces of the underwater structure or whether vegetation or structure happens to slip between elements of the shielding skirt. The term 'audible vibration generator' refers to multiple components of the lure that during rotation of the rotatable member, collide or frictionally engage one another to produce sound and vibrations that emanate from the lure for the purpose of attracting fish. It should be noted that rotating blades and the rotatable portion of embodiments of the present invention both produce vibrations underwater that may be sensed by the fish, even if not necessarily audible to the human ear.

Figure 5:
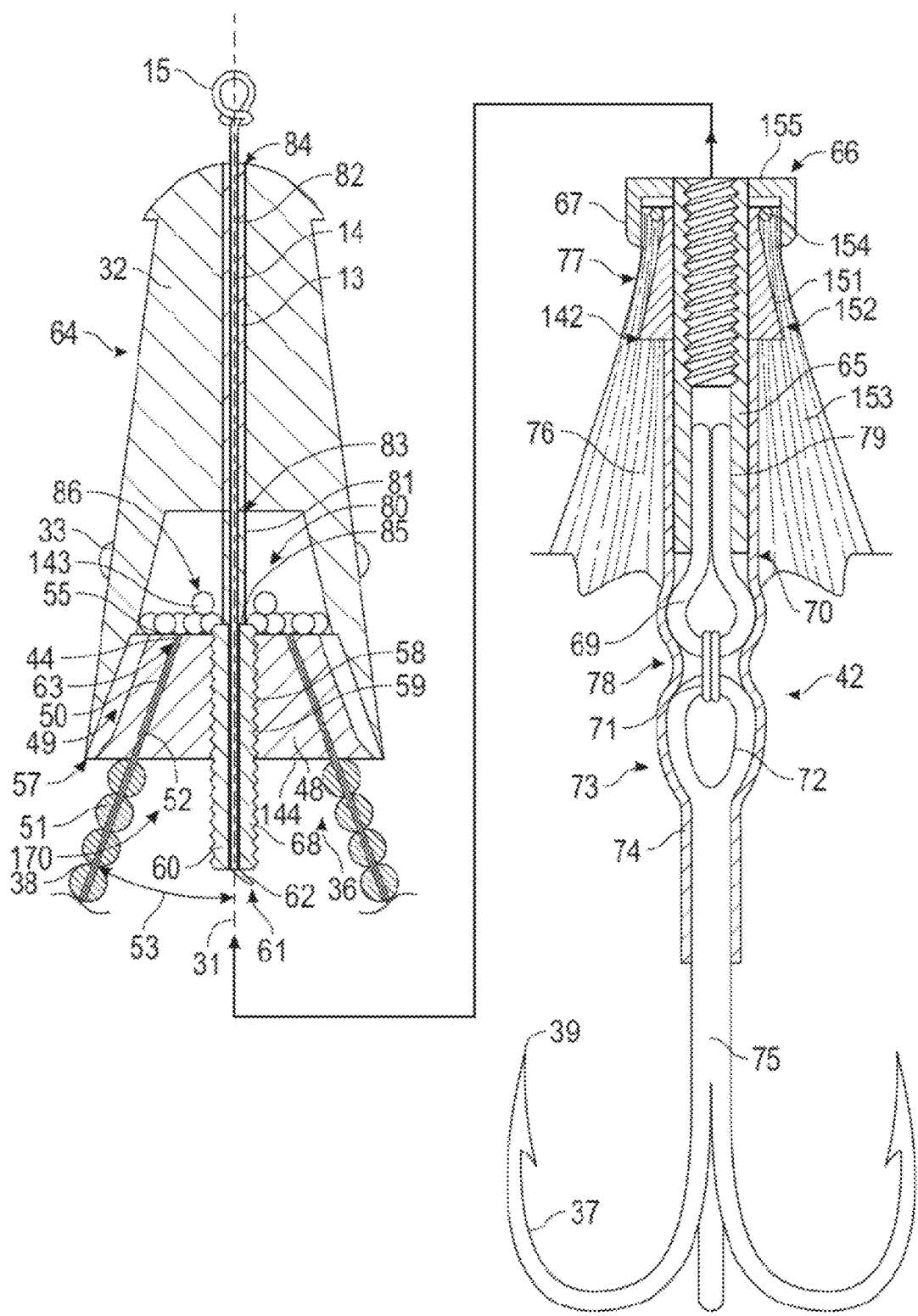
FIG. 5 is a partially sectioned view of a portion of the embodiment of FIG. 1.

The exemplary fishing lure 10 of FIG. 1 includes the lure body portion 11 that is rotatable member 12 configured to spin/rotate about an axial member 13 that is disposed within a central channel 14 that coextends with the central longitudinal axis 31 of the lure 10 and body portion 11. The exemplary axial member 13 is a stainless steel wire with a loop formed at the first, proximal end 16 of the lure body portion 11 that serves as the attachment element 15 for the fishing line or structures attached thereto, such as the snap of a leader. The central channel 14 is sized to permit the rotatable member 12 to freely rotate therein. An optional cannula 82 (e.g., brass, stainless steel) that is illustrated in FIG. 5 can be affixed inside the central channel 14 to house the axial member 13 and possibly provide an inner surface with superior frictional properties. The rotatable member 12 depicted includes a first helical channel 18 and a second helical channel 27 (depicted in FIG. 2a) located 180 degrees from one another. The helical channels 18,27 are formed or recessed into the outer surface 19 of the body portion 12 such that outer surface 19 thereof remains substantially free of protruding structure that would be capable of snagging submerged vegetation or other structure, such as wings, fins, or other structure common in the prior art of a size and design to extend outward and be deflected by fluid friction during retrieval to cause rotation of a rotatable member (e.g., many types of topwater fishing lures). The helical channel 18 of the embodiment of FIG. 1 includes a first side 20, a second side 21, and a channel bottom 22 with the first side 20 being configured and oriented to be the primary receiving surface for fluid friction encountered by the lure 10 as it is being retrieved through a body of water. The fluid friction acting on the first side 20 of the helical channel 18 generates torque that rotates the rotatable member 12 in a predetermined direction, (counterclockwise in this example as viewed from above as in FIG. 2a). During lure retrieval, incoming water flow enters the helical channel 18 at the first end 23 thereof and is directed in a helical pathway, exiting the rotatable member 12 at the second end 24 of the channel 18, located approximately 180 degrees from the start of the first end 23. The illustrative example of the body portion 10 includes an optional nose element 25 that is either integral with or secured to the body 10, or remains unattached (e.g., held in place by the line attachment element 15 (e.g., the illustrative loop) to which the fishing line, a leader, and/or other tackle elements (snap, split ring, swivel, etc.) are attached.

While the two helical channels 18, 27 of the embodiment of FIG. 1 are effective to cause rotation of the rotatable member 12 during retrieval of the lure 10, it is within the scope of the invention to have a single helical channel or more than two (e.g., 3, 4, 5, 6, etc.), such as the embodiment shown in FIG. 2b, which includes four helical channels 18. The embodiment of FIG. 2B also differs from the embodiment of FIG. 2A in that the channels are oriented oppositely so that the rotatable member rotates in a clockwise direction. The helical channels 18 can extend the entire length of the body portion 11 as in the example of FIG. 1, or they can extend partially the length thereof, for example, terminating at the widest portion of the rotatable member 12 with the remaining length of the outer surface 19 of the body portion 11 lacking any helical channels 18 formed thereinto. The exemplary channels 18 are generally trough shaped with sides 20,21 extending up from a channel bottom 22 with a slight outwardly-convex curvature (explained in FIG. 3A), however, it is within the scope of the invention for channels to be U shaped, V shaped or another configuration that provides for a channel surface of side 20 or sides 21 and 22 to be oriented such that they collectively create a fluid pathway that generates torque and rotation of the rotatable member 12 due to fluid friction experienced during retrieval of the lure.

Figure 3A:
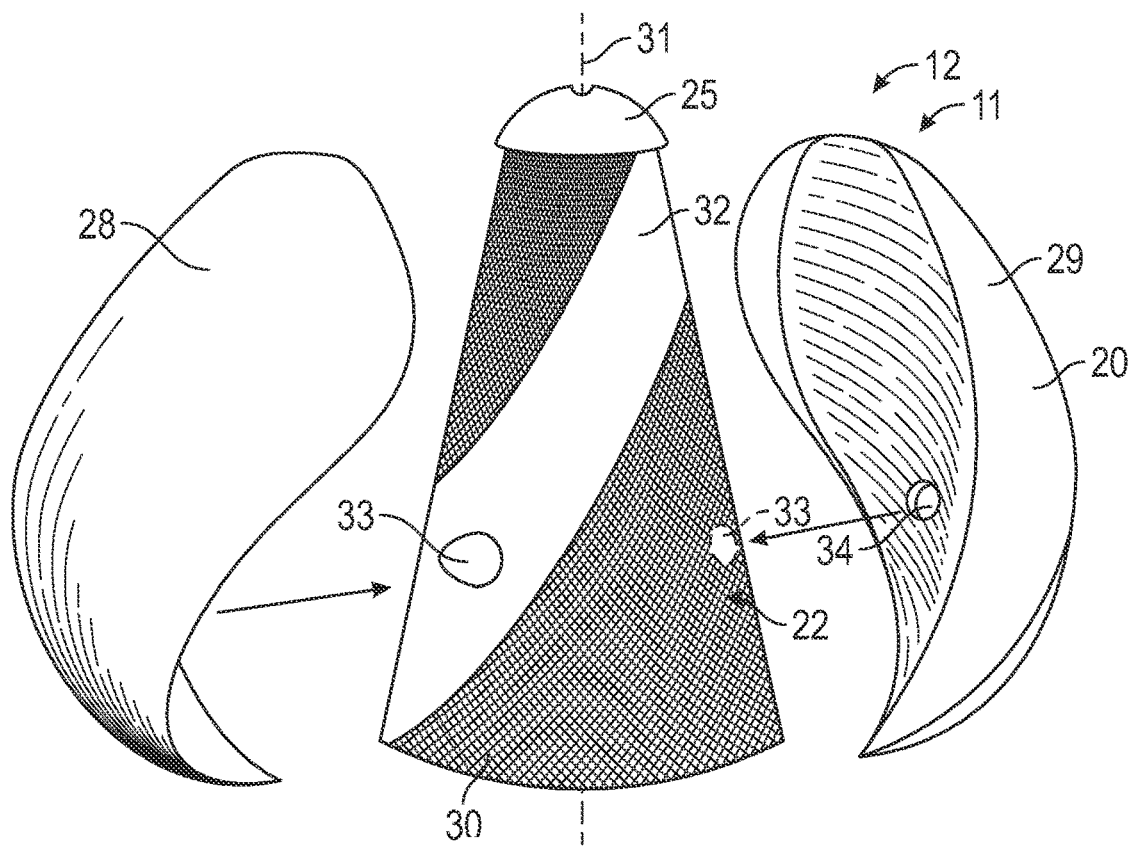
FIG. 3A is an exploded view of a portion of the rotatable member of FIG. 1.

FIG. 3A depicts an embodiment related to those discussed above in that it provides an option for manufacturing the body portion 11 and rotatable member 12 of FIG. 1. The illustrative rotatable member 12 comprises three main components: a core member 32 that comprises a truncated cone shape; a first deflecting member 28 and a second deflecting member 29. The deflecting members 28,29 are glued/bonded (such as with an epoxy and/or cyanoacrylate adhesive) or otherwise secured to the core member 32 and spaced apart from one another to create the helical channels 18,27 (FIG. 2B) therebetween. The lure in the example of FIG. 1 could be made the manner depicted in FIG. 3A or it may be cast or formed as a single component, either by being cast/molded in that particular shape or having the channels 16 machined or otherwise formed by removing material from the lure body portion 11 after it is formed. By forming the rotatable member 12 in the method shown in FIG. 3A, it allows the deflecting members 28, 29 to be cast, 3D printed, machined, or otherwise separately formed so that each can be made in a different color or material than the core member 32 (or each other) before being assembled together if the manufacturing process does not involve forming the rotatable member 12 as a single unit. Possible materials for creating the deflecting members 28,29 for casting (or the rotatable member 12 created as a single component of the lure) include injection-molded hard plastics such as ABS, polycarbonate, among others. Soft plastics, such as plastisol, can be injected or poured into molds to create the deflecting members (or the entire rotatable portion 12). Other castable polymeric or non-polymeric materials may be used that are suitable for the fishing environment. Additive manufacturing (3D printing) offers another option for creating custom parts such as the deflecting members 28,29, the core member 32, and the hub member 48 shown in FIGS. 5 and 6. Common options include FDM printers (Fused Deposition Modeling) using PLA, PETG, or ABS filaments or other options, depending on the properties desired. Another option is using a 3D printer that utilizes an ultraviolet light source to cure a resin that hardens into the component as instructed by resident computer file. These printers typically allow for finer detail desired for certain parts such as the hub member 48 that comprises small diameter channels. There are additive manufacturing options for printing metals or other materials as well. If it is desired to create the rotatable member by removing material from the lure body portion 12 to create the helical channels 18,27, CNC machines can be programmed to remove material, or manual carving, grinding, etc., of materials such as certain metals, wood/organic material, polymers, etc. can be performed.

In the example of FIG. 3A, decals 30 have been applied to the core member 32 such that the helical channel bottom 22 may include a material of a contrasting color/appearance such as holographic or prism tape well known in the fishing lure arts. Having separately manufactured components (e.g., deflecting members 28,29) it may eliminate the need for painting them if different colors are desired, or it may simplify painting or other processes such as clear coating, etc. by not having the rotatable member 12 formed as a single unit. Having the deflecting members 28,29 being different colors can make the lure especially attractive to fish by flashing alternating colors during rotation. Another possible advantage provided by the illustrative method of forming the rotatable member of FIG. 3A is that a conical shape of the core member 32, or an alternative cylindrically shaped core member, comprises a surface having a single plane of curvature that would facilitate attachment of a decal 30 for color contrast or light reflection. The decals can be sized such that the lateral edges thereof lie underneath the footprint of the deflecting members 28, 29 being secured to the core member 32 so as to cover their edges that extend beneath. Assembly of the rotatable member 12 can be aided by having one or more alignment guides 33,34 located on the deflecting member 28,29 and core member 32, such as the exemplary protuberances 33 on the cone member and the corresponding apertures 34 on the first and second deflecting member 28,29. The protuberance 33 may be round or have a different cross-sectional profile, such as square, triangular, etc. Another options for alignment, known to one skilled in the art would be to use one or more alignment pins (not shown) that are inserted into apertures formed in the cone member and deflecting members 28,29, respectively Additionally, the deflecting members 28,29 may be further secured to the core member after assembly by application one or more layers of a clear 2-part epoxy or similar material (e.g., a UV-cured product) that is applied by brushing, dipping, or spraying, depending on what is most effective for the particular clear coat material. Clear coating the body portion provides additional protection to the outer surface 19 and may enhance its appearance. It is particularly advantageous to protect the outer surface 19 with a durable clear coat if a portion of the body portion 11 has been painted or includes one or more decals. In the example of FIG. 3A, the clear coating process can be accomplished or at least partially completed prior or after assembly of the rotatable portion 12. Fasteners such as screws also could be used to secure or help secure the deflecting members 28,29 to the core member 32. It has been found that the clear coat itself may be sufficient to provide sufficient bonding of the deflecting member 28,29 to the core member 32.

Figure 3B:
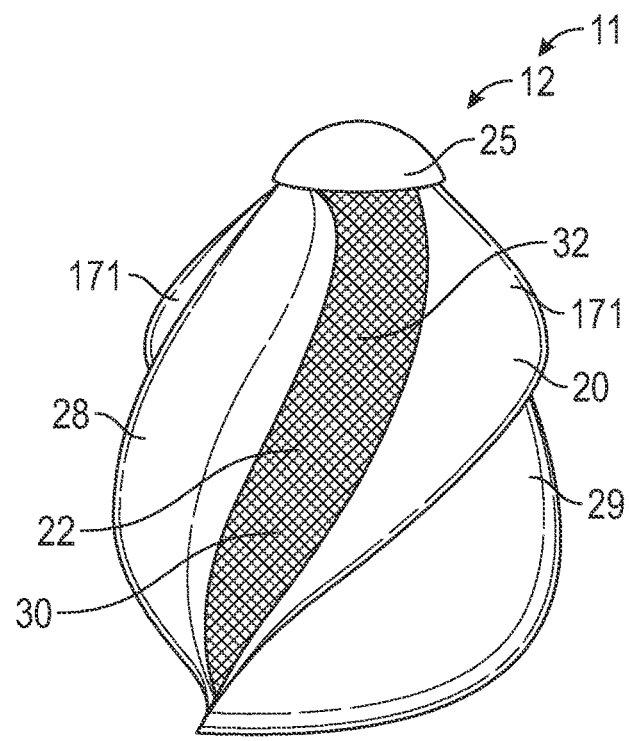
FIG. 3B is a side view of an alternative embodiment of a rotatable portion.

FIG. 3B depicts an alternative embodiment of the rotatable member of 12 the lure body portion 11 in which the fluid receiving surface or side 20 of the channel 18 is widened by the formation of a lip 171 that extends outward beyond the outer surface 19 (as compared to the embodiment of FIG. 1 and FIG. 3A) of the deflecting members 28,29. The lip 171 comprises a convex surface to reduce the likelihood of snaring structure such as a weed. The wider receiving surface 20 created from addition of the lip 171 allows the rotatable member 12 to push out more water outward as it rotates that can result in greater lower frequency generation, known colloquially in the sport as 'thump'. The illustrative lip 171 attempts to balance the advantages of having a relatively streamlined body shape for clean passage through weeds and structure while still offering an increased ability to generate low frequency vibration that is shown to be attractive to some target fish species.

Figure 4A:
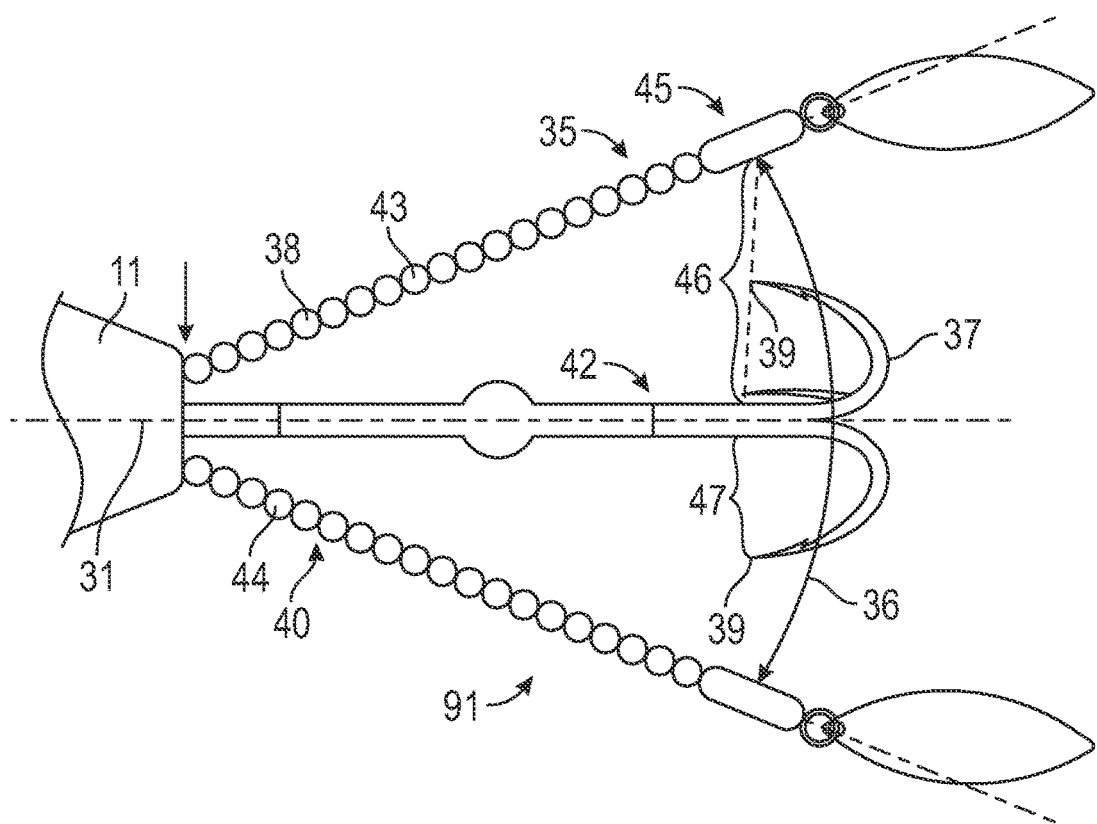
FIG. 4A is a partial, side view of the shielding skirt of FIG. 1 in the first, protective configuration.
Figure 4B:
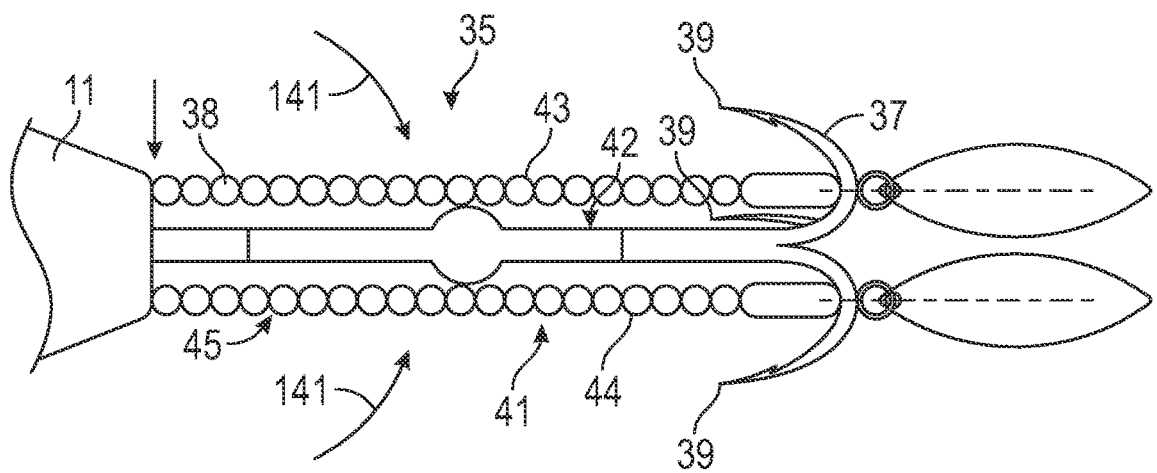
FIG. 4B is a partial, side view of the shielding skirt of FIG. 1 in the second, collapsed configuration

Another feature of the embodiment of FIG. 1 is a shielding skirt 35 that extends outward from the central longitudinal axis 31 of the lure 10 at a distance 46 to define an effective zone of protection 36 and hold that configuration to deflect away vegetation or other underwater structure and/or the lure upon contact to lessen the likelihood of the structure contacting the hook member 37, such as the illustrative treble hook 37 (hook member 37). It is within the scope of the invention for the shielding skirt 40 to comprise a single, flexible skirt element or a plurality of discrete shielding elements 38 of sufficient inherent stiffness or beam strength, or are stiffened by secondary members, so that the shielding skirt 35 assumes a configuration that effectively protects the terminal endpoints 39 of the hook member 37 from the majority of direct contact with weeds and other underwater vegetation, while having sufficiently bendability or collapsibility as a whole to expose the hook member 37 to ensnare a fish attacking the lure 10. This is illustrated in FIGS. 4A and 4B. FIG. 4A depicts a shielding skirt 35 in a first, protective configuration 40 in which the outermost lateral edges 45 of the shielding skirt 35 are designed to extend out at a distance from the central longitudinal axis that is at least close to or greater than the lateral distance 47 of the terminal points 39 of the treble hook 37 from the central longitudinal axis 31 when the lure 10 is being retrieved through a body of water. Depending on the resistance of the shielding elements 38 to bending due to fluid friction (the degree to which they deflect inward), there may be some minimal inward movement of the shielding elements 38, plus possible sag due to the effects of gravity for those that have become oriented upward during retrieval, but not enough such that terminal points 39 of the treble hook 37 become fully exposed to oncoming structure, absent contact with underwater structure such as weeds, grass, branches, or other submerged objects. The degree to which the shielding skirt 35 will deflect and be directed inward when contacting structure will determine its ability to protect the hooks, but optimally, there would be some degree of deflection possible before the terminal point 39 are exposed to oncoming structure. In FIG. 4b, lateral, collapsing forces 141, such as that would result from a predatory fish strike, are able to readily deflect the shielding skirt 35 inward to expose the terminal points 39 of the treble hook/hook member 37 (second, collapsed configuration 41) such that the attacking fish can become ensnared by the exposed hook member 37. In this second, collapsed configuration 41, the terminal hook points 39 now lie outside of the outer edges 45 of the shielding skirt 38 as the lateral force 141 is applied to collapse the shielding skirt 38. Once the force is removed, the shielding skirt 40 returns to the first configuration 91 shown in FIG. 4A due to the resilient properties of the skirt 35. This resilience can be due properties of the connection between the shielding elements 41 and the rest of the lure body 11 or due to properties of the shielding elements 38 themselves. This is in contrast to typical skirts in the art that are usually made of hair, fibers, or polymeric strands which are readily deflected inward from fluid friction and thus, do not offer significant protection to the hook member, which is typically left exposed during retrieval, or do not have sufficient strength or stiffness to prevent structure from contacting the terminal points 39 of the hook member 37. Hook guards have been used in the fishing arts to attempt to address this shortcoming, but have been found, because of their stiffness, to be mostly lacking in their ability not to interfere with hook set. Finding an optimal or desired resistance to deflection of the shielding skirt 40 that balances protection of the hook 37 from vegetation while allowing the hooks to become sufficiently exposed during a fish strike is achievable by routine experimentation with different materials and dimensions of the shielding elements 41. Examples are provided later in this specification.

Still referring to FIG. 1, the illustrative shielding skirt comprises eight shielding elements 38 arranged in a circular array forming a generally conical shape, the shielding elements 38 extending proximally from a hub 48 that is disposed over the axial member 13 and recessed into the body portion 12. In the illustrative embodiment, the shielding elements 38 are permanently attached to the hub 48 member at their proximal ends 44 (FIG. 5) at a predetermined angle so that they collectively provide a conical-shaped zone of protection 36 around the hook member 37 during retrieval (shown in FIG. 4A).

Figure 6:
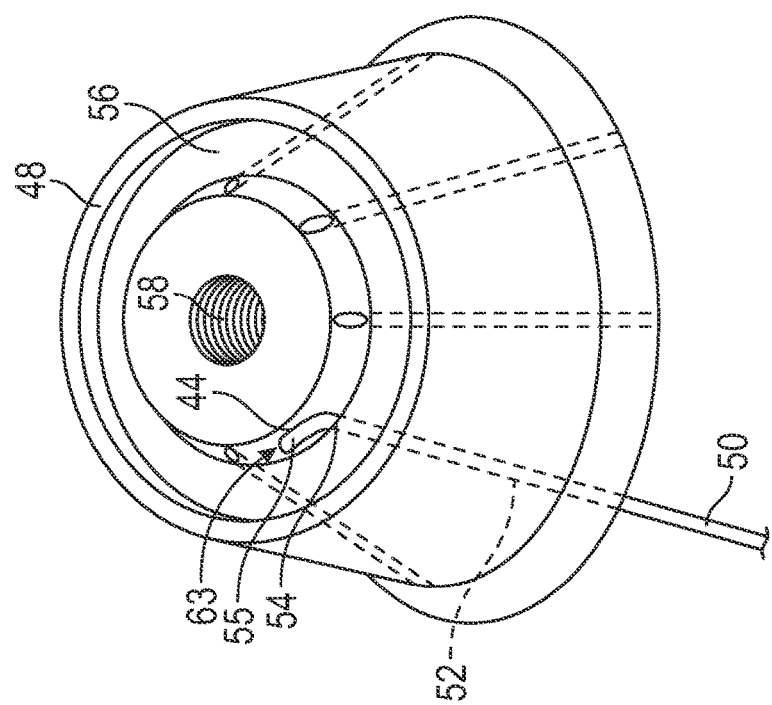
FIG. 6 is a plan view of the hub of FIG. 1.

Now referring to FIG. 5, the optimal, effective angle 53 of the shielding elements 38 from the central longitudinal axis 31 depends on a number of factors, including the size and configuration of the hook 37 being protected, the length and stiffness/resilience of the shielding elements 38, as well as their shape and configuration. For example, the illustrative shielding elements 38 extend outward from the hub 48 at a 22 degree angle from the central longitudinal axis 31. The hub member 48 is placed within a recessed area 49 at the proximal end 26 of the rotatable member 12, in part so that forces acting on the lure are much less likely result in bending of the axial member 21 than if an exposed axial member 13 exited the second end 26 of the rotatable member 12 before entering the hub 48 and didn't have that protection. As depicted in FIGS. 5-6, the hub member 48 has eight passageways 52 that each are sized and configured to accommodate eight wires 50 that are oriented at a desired angle 53 so that they collectively form a cone-shaped zone of protection 36 (also depicted in FIG. 4A). The number of wires 50/shielding elements 38 is a design choice, depending on the configuration of the lure and the degree of protection desired. For example, a smaller size lure may have fewer shielding elements 38. The wires 50 serve as flexural elements that allow the shielding elements to resiliently transition between the first, protective configuration and the second, collapsed configuration. In the illustrative embodiment, the wires/flexural elements comprise a superelastic, shape memory material such as nitinol alloy wire (commercially available from vendor such as the Malin Co., Brookpark, OH) of a diameter that allows the shielding elements 38 to both collapse inward from a fish strike to expose the hook member 37 and resiliently return to the original angle and configuration afterward, the wire diameter largely determined by the size and species the fish being targeted, the type of cover being fished, and the configuration (e.g., weight, material, etc.) of the shielding elements 38. To help prevent egress and loss of the wires 50 and shielding members 38 from the hub 48, the proximal end 44 of the wire is plastically deformed or heat set to include a bend 55 to prevent the wire from slipping through the passageway 52, which is sized to prevent that from happening, as shown in FIG. 6. To further prevent the wires 50 from pulling out of the hub, an adhesive or epoxy material can be applied to the top of the hub 48, which includes a trough 56 in the illustrative embodiment that can be filled with the material to help further hold the wires 50 in place. Wires 50 made of nitinol and certain other superelastic materials have both the ability to return to original shape when forces are released and also to be more resistant to plastic deformation than spring steel or other materials that can be used (and are within the scope of the invention). To deform the nitinol wire into the angled bend 55 at the end, it may be cold worked by overbending well past the desired final angle to create the deformation shown or heat set into that configuration using techniques well known in the art. To help prevent permanent deformation of the wires 50 from over-bending during use of the lure, a series of beads 51 made of plastic, metal, wood, etc. (FIGS. 1 and 5) are placed over the wire 50 that help serve to limit the degree to which the wire 50 can be bent, while still allowing the shielding element 38 to readily assume nearly any shape to which the lure would be typically subjected during normal use. For example, the shielding elements 38, which can be resiliently deformed independently from each other, for example being collectively deformed to generally lie within a single plane when the jaws of a fish clamp down on the skirt 35, thereby providing near-maximal exposure of each of the hooks 37 to make them available for penetrating the mouth of the fish. The beads 51 also serve to advantageously increase the surface area of the shielding elements, as well as becoming an opportunity for creating a desirable color pattern for the shielding skirt 35. The beads can be of any suitable shape, length, durometer, color, or material. Generally, the shorter the bead, the greater the flexibility of the shielding element, however having only a single elongate bead is within the scope of the invention.

Still referring to FIG. 5, the illustrative hook member 37 comprises a standard treble hook 37, however, it is within the scope of the invention to substitute any type of treble, single or double hook 37 such that it is sized to lie with within the zone of protection when properly aligned and constrained. Additionally, one or more other hook members 37 can be attached added to the illustrative lure or any of the embodiments depicted in this application by coupling the second hook member to either directly to the first hook member 37 or another site on the hook assembly 42, such as the hook attachment element 69 using braided wire, leader material, tubing, or another suitable method. The hook member 37 is maintained within the protective shielding skirt 35/zone of protection 36 during retrieval of the lure by a constraining element 73 such as the illustrative polymeric heat shrink sleeve 74 that is has a large enough internal diameter to slide of the elements of the hook assembly 42, then shrunk down to using a heat source over the junction region 78 within the hook assembly 42 (defined as hook member 37 and structures attached thereto as described below) such that they are aligned in a relatively straight configuration, at least unless the hook assembly 42 is deflected with sufficient force. Without the constraining element 73, the illustrative treble hook would move from side to side with the terminal endpoints 39 of the hook might no longer be protected from contact with underwater structure. It should be noted that the optional second hook member (not illustrated) may include a constraining element 73 to align the hook and provide for maximum protection behind the protective region 36 of the shielding shirt 35. The aforementioned hook assembly 42 includes the constraining element 73, the hook member 37, a standard split ring 71 connected to the eye 72 of the hook member 37, and a section of metal cannula 65 (e.g., brass or stainless steel) with a hook attachment element 69, such as the illustrative cotter pin held within the lumen of the cannula with an epoxy, such as J-B Weld Steel Reinforced Epoxy (J-B Weld Co., Sulphur Springs, TX), or it can be soldered or welded inside the internal passageway 79 of the cannula 65 with the loop for attaching to the split ring 71 extending from the distal end 70 thereof. The split ring 71 connects the hook 37 to the hook attachment element 69. While the split ring 71 could be eliminated such that the hook attachment element is connected directly to the hook 37 such that the junction region 78 has a single articulation point, the split ring 71 advantageously permits the hook member 37 to be removed and replaced without replacing the entire hook assembly 42. As noted, the hook assembly 42 constraining element 73 comprises a portion 151 that is disposed over the proximal end 66 of cannula 65 of the posterior hook assembly 42. The inner portion 151 includes a flange 156 at the first end and a flared section 152 distally that directs the skirt elements 153 outwardly. A constraining mechanism 154 such as a wrapped wire/thread, o-ring, etc. Is secured around the inner portion 151 and skirt elements 153 and cinched against the flange 156. An adhesive may be applied over the cinched wire 154. in the exemplary embodiment, the skirt elements 153 are folded over the wire 154 and a cap-like outer portion 155 of the collar 77 is snapped over the inner portion 151 flange 156 and optionally secured with an adhesive or bonding agent. The illustrative inner skirt 76 that is positioned over the cannula within the zone of protection beneath the shielding elements 38 is primarily for decorative purposes as a fish attractant, although possibly offering some ability to help keep the shielding elements 38 from being directed inward and becoming caught on the hook member 37. The heat shrink 74 of the illustrative embodiment is but one possible type of constraining member 73. For example, a removable, elastic or flexible sleeve (or tubing) can be placed over the junction region 78 to maintain the alignment of the hook 37, while still allowing it the hook to flex at that junction 78 when lateral forces are applied, functioning like the heat shrink 74 depicted. Alternatively, the junction region 78 could be wrapped with thread, elastic band or other type of wrapping that could allow for a degree of flexing at that junction. section of heat shrink material 74 that completely encloses the junction region 78, terminating distally along the hook shaft 75 and extending proximally to a point 142 along the outer surface of the cannula 65. The heat shrink material 74, (e.g., thin-wall or adhesive-lined polyolefin) is positioned over the junction region 78 and shrunk to its final size using a head gun or other heat source. When replacing or changing a hook member 37, the sleeve of heat shrink material 74 would need to be removed to uncouple the hook 37, then be replaced once the new hook is in place. In the illustrative example of FIG. 5, the first, proximal end 142 of the heat shrink material 74 terminates at a point proximal the distal end 66 of the cannula 65 with sufficient space allowed to provide a stop for the collar 77 of the optional inner skirt 76 depicted, the collar 77 then extending flush with the distal end 66 of the cannula The exemplary collar 77 comprises an inner portion 151 that is disposed over the proximal end 66 of cannula 65 of the posterior hook assembly 42. The inner portion 151 includes a flange 156 at the first end and a flared section 152 distally that directs the skirt elements 153 outwardly. A constraining mechanism 154 such as a wrapped wire/thread, o-ring, etc. Is secured around the inner portion 151 and skirt elements 153 and cinched against the flange 156. An adhesive may be applied over the cinched wire 154. in the exemplary embodiment, the skirt elements 153 are folded over the wire 154 and a cap-like outer portion 155 of the collar 77 is snapped over the inner portion 151 flange 156 and optionally secured with an adhesive or bonding agent. The illustrative inner skirt 76 that is positioned over the cannula within the zone of protection beneath the shielding elements 38 is primarily for decorative purposes as a fish attractant, although possibly offering some ability to help keep the shielding elements 38 from being directed inward and becoming caught on the hook member 37. The heat shrink 74 of the illustrative embodiment is but one possible type of constraining member 73. For example, a removable, elastic or flexible sleeve (or tubing) can be placed over the junction region 78 to maintain the alignment of the hook 37, while still allowing it the hook to flex at that junction 78 when lateral forces are applied, functioning like the heat shrink 74 depicted. Alternatively, the junction region 78 could be wrapped with thread, elastic band or other type of wrapping that could allow for a degree of flexing at that junction.

Still referring to FIG. 5, the lure is configured such that the hook assembly 42 can be uncoupled/removed, such as to remove and replace the inner skirt 76, if necessary, or to replace the hook member 37. This is accomplished in the illustrative embodiment by uncoupling the cannula 65 of the hook assembly 42 from the hub assembly 170 that comprises the hub 48, attached vented screw 59, and axial member 13. The illustrative hub 48 includes a threaded central passageway 58 through which the vented screw 59 is disposed, extending distally beyond the bottom edge 144 of the hub 48. The cannula 65 of the hook assembly 42 includes an internally threaded section 67 proximally that engages with the external threads 68 of the vented screw 59. The two main body sections 12, 64 are joined by screwing them together until the distal end 66 of the cannula 65/hook assembly 42 abuts the bottom surface 144 of the hub 48. They may be held in place with a removable thread-locking compound (e.g., Loctite Threadlocker Blue 242 or 222MS Purple) or joined in other manner known to one skilled in the art (e.g., a set screw) to prevent them from accidentally uncoupling during use of the lure. The axial member 13 extends through the passageway 60 of the vented screw 59 and further secured by creating a bend 62 of the axial member as it exits the proximal end of the vented screw 59. The vented screw 59 may optionally be glued or bonded to the hub, or it can remain unsecured thereto and held in position by the bend 62 bonded to the vented screw 59 and axial member 13. The top 85 or first end of the vented screw 59 serves as a hard stop for a spacer element 81, such as the illustrative cannula (e.g., a leader sleeve), beads, or other elements that maintain the correct, desired position of the illustrative cone member 32 relative to the hub 48. The spacer element 81 extends through an inner chamber 80 and terminates distally at the second, distal end 83 of an inner cannula 82 disposed within the central passageway 14 of the rotatable member's 12 cone member 32 and through which the axial member 13 passes. The inner cannula 82 is sized slightly larger than the diameter of the axial member 13 and is bonded to the rotatable member 12. In the illustrative embodiment, the spacing element 81 is not attached to either the rotatable member 12 or the hub 48. When the axial member 13 is bonded to the vented screw 68 in the optimal position where the bottoms edges of the hub member 48 and cone member 32 are relatively aligned and a space 57 is maintained between therebetween, the proximal body portion assembly 64 is in the desired configuration for attachment to the hook assembly 42 to complete the lure 10.

Still referring to FIG. 5, the rotatable member 12 further includes an audible vibration-generation mechanism 86 for creating sound waves audible to humans that are disseminated outward as the lure 10 is retrieved through the water. In the illustrative example, vibration/sound is generated by a plurality of free elements such as the illustrative metal balls 143 that are loosely disposed within an open chamber 80 disposed within the cone 32 and located above/proximal the hub member 48. As the rotatable member 12 is spinning, the plurality of metal balls 143 collide with one another, the walls of the chamber 80, and the spacing member 81 to create the vibrations that have been shown to attract fish. Since the chamber 80 is in communication with the space 57 between the hub 48 and cone member 32, the chamber 80 fills with water during retrieval, which then is able to drain out when the lure is taken out of the water. The illustrative embodiment is configured such that there is minimal space 57 between the hub and cone member (e.g., less than 1 mm) so as not permit the metal balls 143 to fall out of the chamber 80, as well as to make it difficult for material, such as inner skirt elements 153, to enter though the space 57 into the chamber 80, possibly becoming entangled therewithin and inhibiting the ability of the rotatable member 12 to freely rotate. An optional screen (not shown) could be placed below the chamber 80 and space from the hub 48 to further inhibit material from entering the chamber. Loose metal balls 143 of the embodiment of FIG. 5 are one of many possible solutions for creating an optional audible vibration-generating mechanism 86. For example, structures like flaps, teeth, etc., can be mounted on the rotatable member 12 or a non-rotating structure like the hub 48, with a corresponding structure on the opposite rotating/non-rotating counterpart so that they come into contact as the rotatable member 12 spins during lure retrieval. One skilled in the fishing lure arts could readily design other possible audible vibration-generating mechanisms 86 that take advantage of the action of the rotatable member 12 to generate vibration and sound as a stimulant to attract fish.

Figure 7:
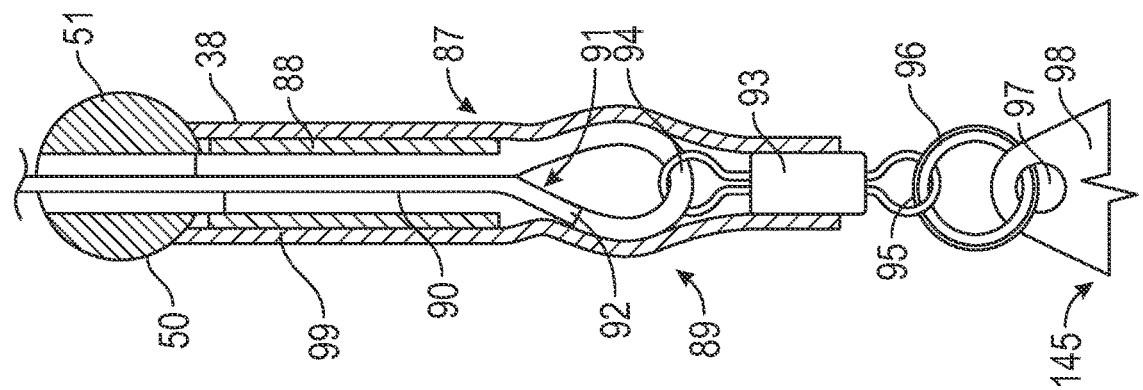
FIG. 7 is a partially sectioned view of the second end of the shielding element of FIG. 1.

Referring again to FIG. 1, the shielding elements 38 terminate beyond the section containing the beads 51 where they contain a coupling section 89 from which coupled structure 145, such as the illustrative willow leaf blades 98, is flexibly attached. Now referring to FIG. 7, the exemplary coupling section 89, just one example of many possible methods of creating a means for attaching to coupled structure, comprises multiple components that both serve to prevent the beads 51 from detaching from the shielding element 38 and provide a means to couple to an element such as the blade 98 depicted, an example of an interchangeable coupled structure 145. In the example depicted, the wire 50 that extends through and out distally from the series of beads 51, includes a terminal distal bend 92 similar to the distal bend 55 shown in FIG. 6 and formed in a similar manner. The bend 55 is of a length and angle to allow the beads 51 and the metal sleeve 88 (e.g., a leader sleeve available from fishing supply houses such as lurepartson-line.com) to pass through, assuming one does not wish to create the bend after the beads and sleeve are preloaded over the wire. A cotter pint 90 is inserted into the metal sleeve 88 and secured with solder or an epoxy material, such as K-B Weld® or another suitable adhesive or bonding agent. The terminal bend 55 extends distally out of the sleeve 88 to serve as a stop to help prevent the coupling section 89 from coming apart and slipping off, thereby allowing the beads 51 to slip off the wire 50. In the illustrative example the cotter pin 90 provides a closed loop to which a swivel 93 (e.g., the Crane type swivel depicted) is coupled to allow the blade 98 to rotate during retrieval of the lure. The swivel 93 is coupled proximally to a split ring 96 that is inserted through a hole 97 in the blade 98 to flexibly attach the blade to the coupling section 89 of the shielding element 38. In the exemplary embodiment, the blades are sized and spaced to collide with adjacent ones to provide a further source of underwater vibration. A section of heat shrink material 99 is shrunk over the coupling section 89 from the last bead 51 to the swivel 93 such that the articulation point between the coupling section 89 and the blade lies about the split ring 96, reducing degree to which the coupled structure 145 can flex, possibly reducing the likelihood of the shielding element 38 getting caught on the hook member 37.

Figure 8:
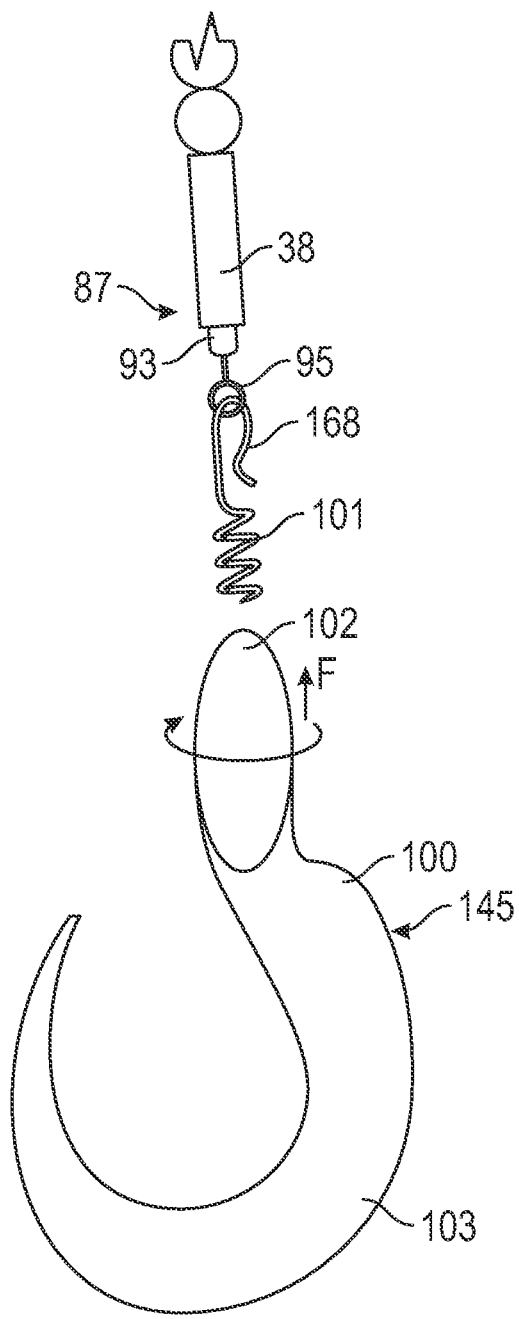
FIG. 8 is a side view of another embodiment of coupled structure of the present invention.

Now referring to FIG. 8, alternative coupled structures 145 to the blades of earlier figures may be attached to the shielding elements 38 to provide attractants to fish. In this embodiment, the coupled structure 145 comprises a flexible tail element 100, similar to those found on a soft plastic fishing grub tails. The flexible tail element 100, typically made from plastisol or another similar soft polymer, comprises a head portion 102 from which extends the flexible, hook-shaped tail portion 103 that is configured to fold back over distally and flutter or ripple in the presence of fluid friction as the lure is retrieved through the water. In the example shown, the flexible tail element 100 is coupled to the coupling section 89 of the shielding element 38 via a screw element 101 (e.g., a 'Hitchhiker' available from fishing supply vendors such as lurepartsonline.com). The screw element 101 is rotated/screwed into the head 102 portion and embedded therein at a sufficient depth to close any gap that would allow the screw element 101 to become uncoupled from the coupling section 89, which in the example shown comprises a swivel 93 at the second end 87 of the shielding element 38. While the exemplary flexible tail element 100 has a single tail, alternative tail elements 100 having multiple tails or tails of different shapes or lengths can be substituted. The coupled structures 145 of FIGS. 1 and 8 are but two of many possible examples that may be used to provide an attractant flexibly attached to the shielding elements to enhance the visibility or vibration-generation ability of the lure. Examples include but are not limited to flexible strands such as natural hairs, synthetic fibers, mylar strands, etc., or any structure configured to dangle, wobble, flutter, rotate, flash, collide, vibrate, emit light or otherwise bring attention to the posterior portion of the lure. The user may wish to mix different types of coupling structures 145, such as alternating the blades 98 of FIG. 1 with the tail elements 100 of FIG. 8 to provide the different properties and potential advantages of each.

Figure 9:
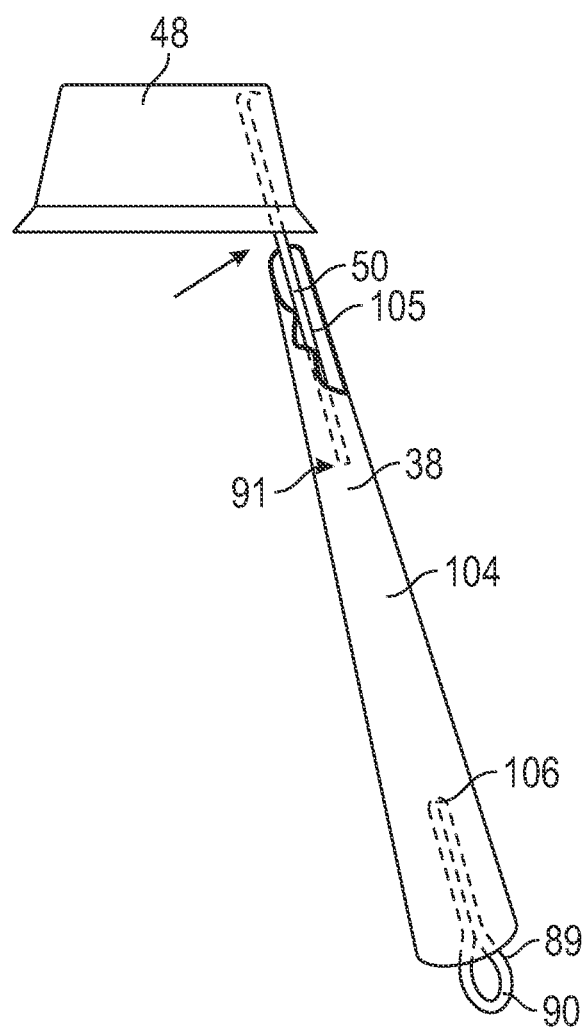
FIG. 9 is a side view of another example of a shielding element.

FIG. 9 depicts an alternative embodiment of a shielding member in which the shielding skirt 35 comprises shielding elements 35 in which a superelastic, shape memory wire 50 extends from the hub 48 and is connected to an elongate shielding member 104 that comprises a majority of the length of the shielding element 38. The bending of the wire 50 is limited to the junction area 146 of the wire 50 between the hub 48 and elongate shielding member 104, rather than along the majority of the length of the wire in the embodiment of FIG. 1/FIG. 5. In the illustrative embodiment the distal end 91 of the wire 50 is affixed to the elongate shielding member 104 within a channel 105 at the proximal end using epoxy or another bonding agent. Alternatively, the distal end of the wire 91 could comprise a bend or an attached structure to help prevent it from uncoupling from the elongate shielding member 104. As depicted in FIG. 9, a distal channel 106 within the elongate shielding element 104 houses a cotter pin 90 that comprises an attachment element 89 for attaching to coupled structure 145, such as the tails 100 of FIG. 8 or the blades 98 of FIG. 1/FIG. 7.

Figure 10:
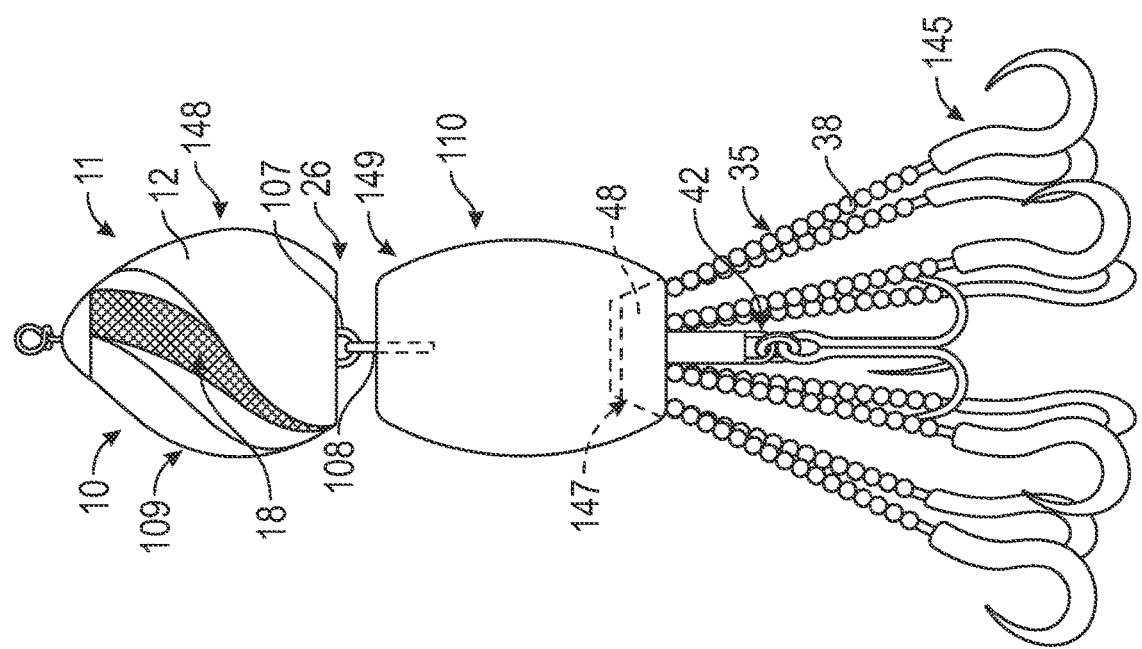
FIG. 10 is a side view of another embodiment of the fishing lure having two body sub-portions.

FIG. 10 depicts a lure 10 of the present invention wherein the body portion 11 comprises first and second sub-portions 148,110 that include the rotatable member 12 as the first sub-portion 148 that is flexibly coupled to a second, posterior body sub-portion 110 via a coupling element 107 (such as an embedded screw eye, cotter pin, looped wire, etc.) that extends from the second end 26 of the first sub-portion 148 (rotatable member 12) and attaches to a second coupling element 108 extending from the proximal end 149 of the second body sub-portion 110. Rather than the hub 48 being recessed into the rotatable portion 12 such as in earlier depicted embodiments, the hub 48 is located within a recessed chamber 147 in the second body sub-portion 110 so that neither the hub 48 nor the second body sub-portion 110 rotate, only the first sub-portion 148 being a rotatable member 12. Alternatively, optional helical channels could be formed into the second body sub-portion 110, along with an axial member and central channel to make it the rotatable member 12 (not depicted) while the first body sub-portion 148 remains non-rotating. Additional non-rotating members could be coupled to the other sub-portions so that the body portion comprised 3,4, or more separate sub-portions. Or, another embodiment within the scope of the present invention would comprise two or more rotatable members 12 as separate sub-portions that either shared a common axial member or included discrete axial members for each sub-portion. The number, configuration, or type of sub-portions of the body portion is not limited within the present invention. Similarly, the type of shielding skirt 35 or coupled structure 145 in the embodiments depicted, which in example of FIG. 10, comprise beads 51 over a wire 50 for the shielding elements 38 (similar to FIG. 1/FIG. 5) and coupled structure 145 of soft plastic tails 100 similar to that shown in FIG. 8, are not limited to the example depicted. The illustrative embodiment does not include an inner skirt 76 surrounding the hook assembly 42, unlike the embodiment of FIG. 1.

Figure 11:
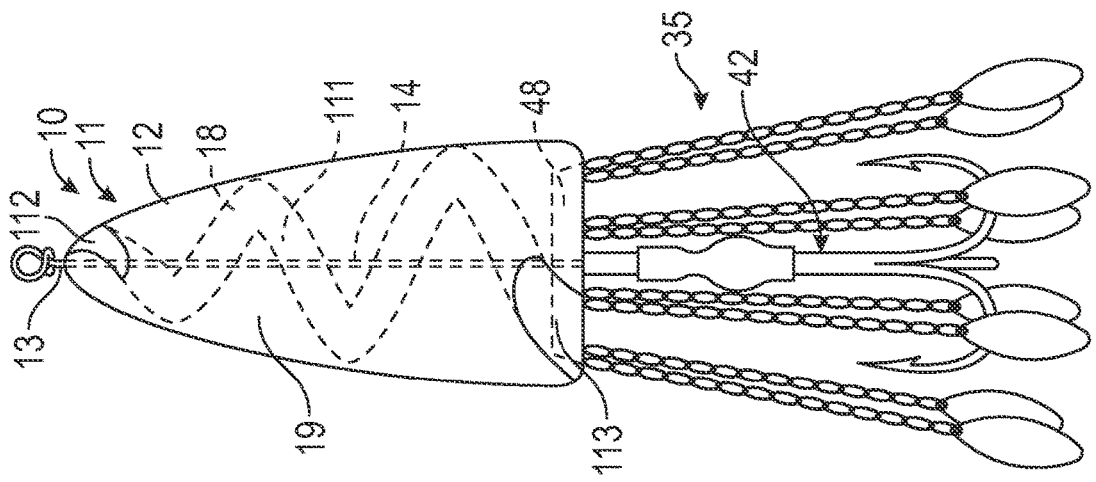
FIG. 11 is a side view of another embodiment of the fishing lure having an internal helical channel.

Another embodiment of the present invention with alternative features is shown in FIG. 11. As depicted, the channel 111 for receiving and deflecting incoming flow to cause torque and rotation of the rotatable member 12 is contained within/underneath the outer surface 13 thereof rather than being formed into the outer surface 13 as with the embodiment of FIG. 1. As such, only the fluid entry port 112 of the channel 111 and the exit port 113 are open externally. The size of the openings 12.113 can be adjusted to produce the rotational properties desired. While the entry port 12 needs to be of sufficient size to allow for enough flow through to produce rotation, the exit port 113 could be larger or smaller, such as to produce a Venturi effect. To produce visual attractive features on the surface 13 of rotatable member, decals or paint can be applied, such as to create a 'barber pole' pattern, or the rotatable member can comprise two halves or more of different colors that are glued or otherwise coupled together over the axial member 13. The helical internal channel 111 can be formed during the casting process, machining, 3-D printing or any other suitable method. Alternatively, the helical channel 16 can be formed into the surface of an inner rotatable member 12 component (e.g, injection molding) with an outer shell or covering then being placed thereover to enclose the channel 111 other than the two openings 112,113 at either end of the rotatable portion. This could have possible advantages for creating a jig where the inner component could be lead or another metal to serve as a weight, while the outer component shell might be a plastic or other material with different properties. Or, the inner member might comprise a more buoyant material than the outer shell. Another alternative feature is the shielding skirt 35 and hub 48 being attached to the body portion 11/rotatable member 12 instead of a hub mounted to the and remaining stationary (non-rotating) with the axial member 21. As such, the shielding skirt 35 rotates with the rotatable member 12 about the proximal hook assembly 42. In this particular embodiment, the shielding elements 35 are the 'beads over a wire' configuration of the FIG. 1 embodiment, however, they could comprise bristles or other elongate elements with sufficient rigidity and flexibility such that the outer surface 43 of the shielding skirt 38 extends outward at a sufficient distance and strength to provide the protective configuration 40 shown in FIG. 4A while, having sufficient collapsibility needed expose the hooks 37 sufficiently for hook set of the fish in the collapsed configuration 41 shown in FIG. 4b, while returning to the protective configuration 40 when the collapsing force is removed.

Figure 12:
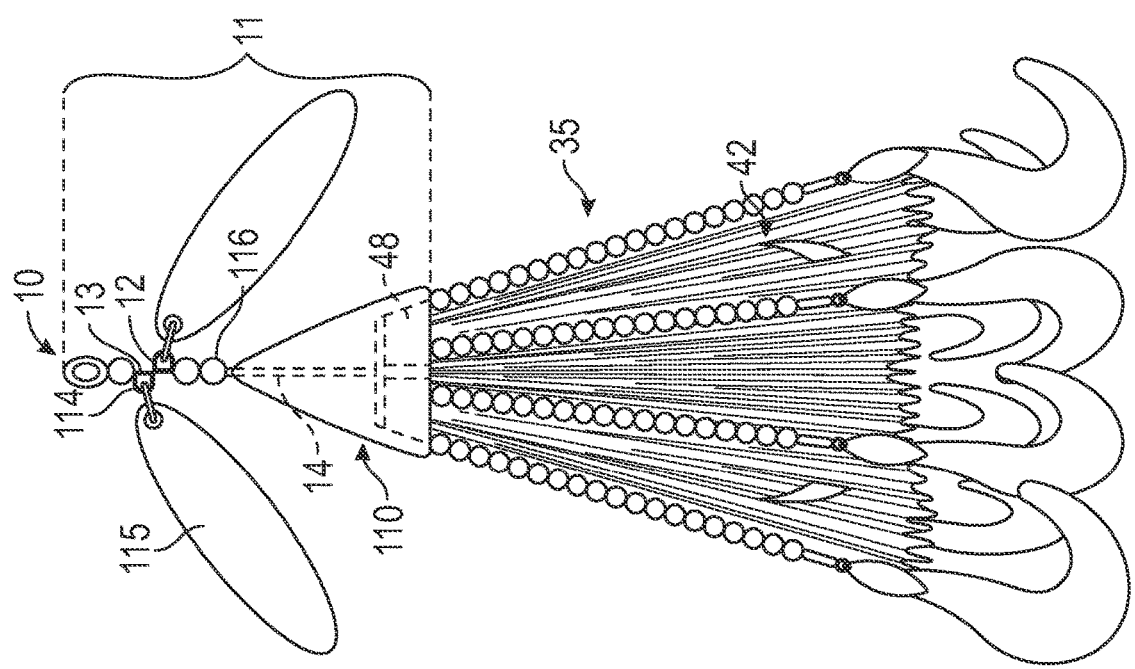
FIG. 12 is a side view of another embodiment of the fishing lure having an alternative rotatable member.

FIG. 12 depicts yet another embodiment wherein the deflectable shielding skirt 38 of the type shown in most of the previous figures is paired with a rotatable member 12 that comprises metal blades 115 attached to a clevice 114 such as the type found on 'bucktail' type lures. Traditionally, either one or two blades (as pictured) are used with a single or double clevice 114. The type of blade (e.g. willow leaf, Colorado, Indiana, French, fluted, etc.). In the illustrative embodiment of FIG. 12, the body portion 11 further includes a second body sub-portion 110 located proximally the rotatable member 12 (blades 115) with optional spacer beads 116 located therebetween. The second body sub-portion 110 houses the hub 48, which is affixed thereto, or alternatively, the second body sub-portion 110 could include external or internal channels such that it rotated about the hub 48 and comprise a second rotatable member (not depicted). Yet another alternative embodiment would have just the hub 48 attached to the axial member 13 and not be housed within a second body sub-portion 110. Unlike most bucktail lures where the skirt comprises animal hair or artificial elements such as foil or soft plastic strands that are too flexible to maintain the sufficient rigidity or configuration to adequately block weeds and vegetation from becoming ensnared on the hook member 37, the illustrative shielding skirt 38 offers the functionality discussed in previous embodiments to maintain a protection configuration during retrieval while being deflectable inwardly during a fish strike to expose the hooks.

Figure 13:
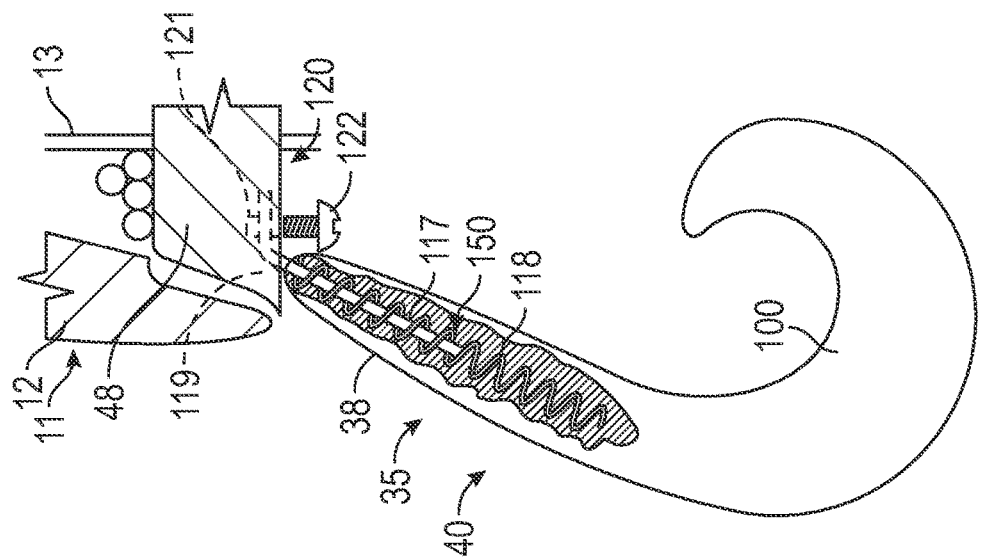
FIG. 13 is a partially sectioned view of another embodiment of the shielding element.

An alternative shielding element 38 is depicted in FIG. 13 in which a soft plastic tail element 100 serves as the major component of the shielding element 38, rather than being limited to functioning as a coupled structure 145 extending from the end of the shielding element 38 as shown in FIGS. 10-12. The soft plastic tail 100 is able to assume the both the protective and collapsed configured discussed in FIGS. 4A and 4B by inclusion of a flexural assembly 150 that may be formed/inserted into the tail 100 during the casting process or introduced thereinto afterward. The flexural assembly 150 comprises a stiffener element 117 that connects into the hub 48 and a spring member 118 that is attached to the stiffener element 117 and extends distally further into the soft plastic tail 100 to help maintain the tail in the protective configuration 40, while still allowing for sufficient collapsibility to expose the hook member (not pictured). In the illustrative embodiment, the stiffener element 117 includes a proximal bend 119 that comprises the portion that is seated into the bottom of the hub 48. To make the soft plastic tail 100 replaceable (it being especially subject to damage or loss during angling-related activities by the nature of the material), a fastener 122, such as the illustrative set screw or other type fastener, is introduced through a hole in the bend portion 119 and secured into a threaded recess 121 within the bottom of the hub 48. To replace a damaged soft plastic tail 100 or change to a different color or configuration, the fastener screw 122 is backed out of the recess 121 and the entire shielding element 38 comprising the tail 100 and flexural assembly 150 is uncoupled and replaced. The illustrative embodiment of FIG. 13 is merely exemplary as one skilled in the mechanical arts would readily conceive of many other possible methods of creating a replaceable shielding element in the event a new or different one is desired. Of course, the shielding element 38 depicted in the figure could also be permanently attached if so desired, particularly if a more durable material and configuration is used that is less subject to damage. Furthermore, the shielding elements 38 either can be separate from one another or cast together to form a shielding shirt 35 capable of being resiliently depressed to expose the hook element 37. This can be done by incorporated a series of flexural assemblies 150 as shown in FIG. 13 or structure having fulfilling the same structure. Or, the skirt can be cast in a configuration that relies on the resilience of the soft plastic (e.g., plastisol) material to compress from the protective configuration to temporarily assume the collapsed configuration when inward force is applied. For example, the soft plastic material of the proximal part of the skirt could extend inwardly and brace against the hook assembly shown in previous figures to allow for movement between the two configurations.

Figure 14B:
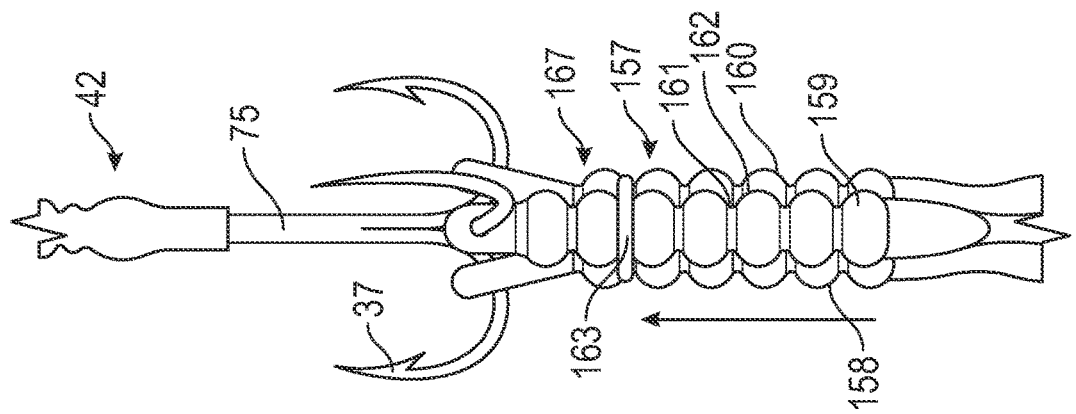
FIG. 14B is a side view of an embodiment of a hook appendage.
Figure 14A:
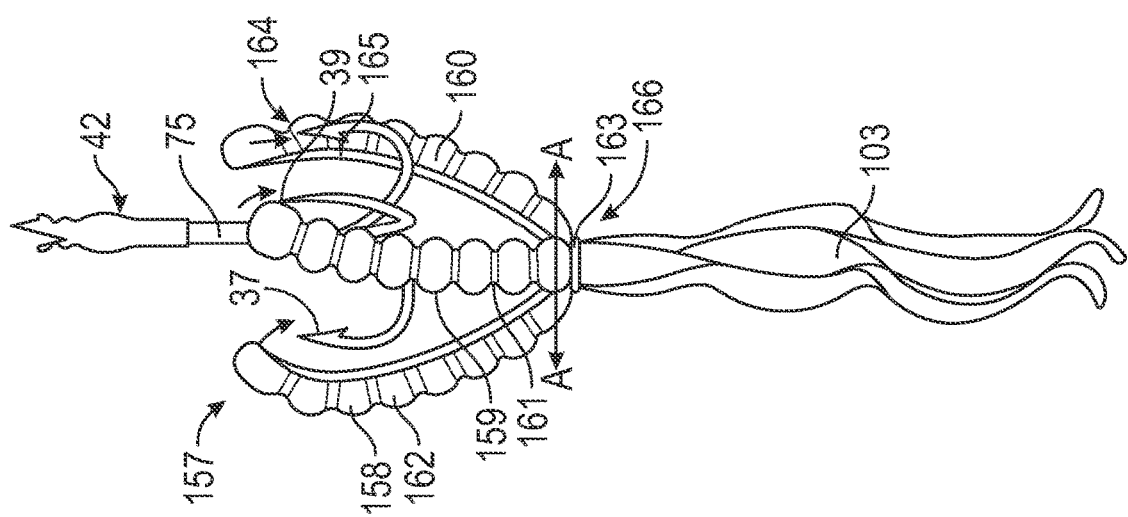
FIG. 14A is a side view of an embodiment of a hook appendage.
Figure 14C:
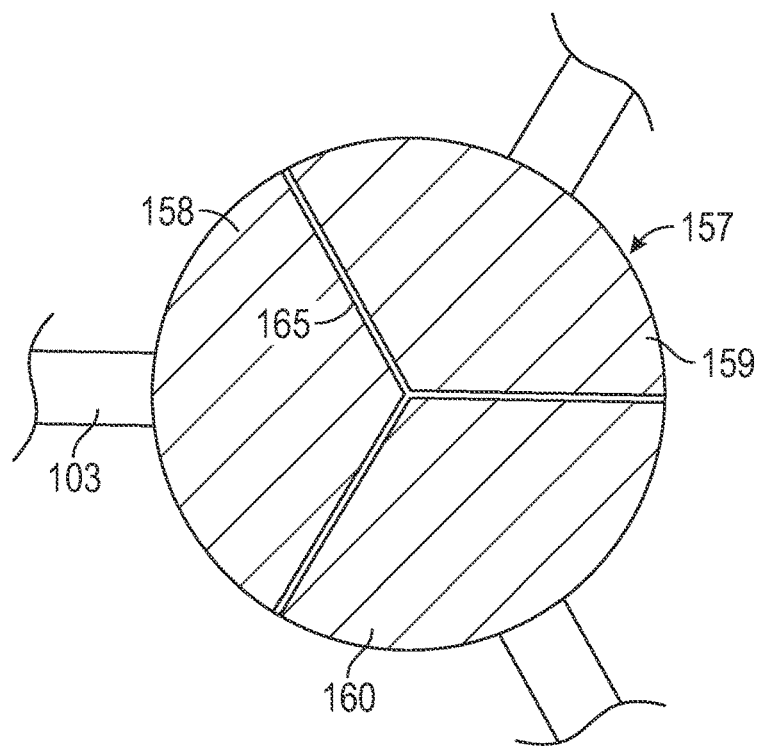
FIG. 14C is a cross-section of the embodiment of FIG. 14A taken along line a-a.

In addition to the coupling structure shown in previous figures whose movement during retrieval is intended to attract fish strikes, structure such as soft plastic tails, can be attached to the hook member for the same purpose, a strategy that is well known to anglers. FIGS. 14A-14C depict a novel hook appendage 157 for attaching to the treble hook member 37 that allows the tails 103 of three separate tails elements 158,159,160 to flutter behind the hook member 137 to further attract fish. The three tail elements of the present invention are joined by a constraining mechanism element 163 shown in FIGS. 14A-B, such as the illustrative ring, that is sized and configured to reside within a groove 161 or depressed area that lies between adjacent sections 162 of the tail elements 158,159,160. The groove is configured such that the constraining mechanism stably seats therein across all three tail elements 158,159,160 that include a v-shaped inner surface 165 (in cross-section) so that the three tail elements fit together to assume a circular cross-section as depicted in FIG. 14C when brought together as in FIG. 14B. As shown in FIG. 14A, the tails elements 158,159,160 of the hook appendage 157 each have a proximal portion 164 that can be separated from adjacent ones when the constraining means 163 is in a loading position 166 which is oriented closer to the tail sections 103 such that the user has a sufficient amount of tail element with which to attach the tails elements to the hook member 37. The individual tail element 158,159,160 are then attached to each of the three hooks of the treble hook member 37 by piercing the terminal endpoints 39 of each hook through the proximal portion 164 of a respective tail element and slid down thereover to expose the terminal end points 39 and as much of the hook member 37 as possible (shown in FIG. 14B). After the tails elements 158,159,160 are coupled to the hook member 37, the constraining element 163 may be slid up over the individual segments 162 of the tail elements and into a desired groove 161 so that the hook appendage 157 assumes a constrained position 167, as shown in FIG. 14B, that allows the tails 103 increased separation during operation of the lure and pull the tail elements to be drawn inward toward the hook shaft 75 for maximal exposure of the individual hook components. The loading and constrained positions 166, 167 are relative to one another with the operator able to choose any of the grooves 161 to place the constraining element 163 for either the maximum or a lesser degree of constraint of the tail elements 158,159,160 toward the hook member/hook assembly 42. Alternatively, the hook appendage 157 may include two or more constraining elements, if desired, such as to join the three tails at multiple points, such as at the distal end of the proximal portion 164 to lessen separation of the three tails 103 and one at the proximal end of the proximal portion 164 to cinch together the three tail elements 158,159,160. Alternative configurations of the tail elements 158,159,160 are possible, such as changing the length, diameter, number of segments, number of tail portions 103, etc. Also within the scope of the invention is substitution of a different of the illustrative ring comprising the constraining member 163, which can be metal or a rigid or elastic polymer (e.g., an o-ring). The ring can be complete or split so that it can be crimped or expanded. Alternatively, the constraining element 163 can comprise a split, crimpable, or intact metal cannula/elastic sleeve, a cable tie, a clamp, a wrapping of thread, wire, etc. or any structure known in the art to join the three tail elements together. While the tail elements 158,159,160 of the hook appendage 157 are typically cast with a plastisol polymer that makes them particularly compressible, allowing them to be readily pushable through the constraining element 163 so that the constraining elements does not necessarily need to be expandable to urge it into different grooves 161 along the tail elements, it is within the scope of the invention for constraining member 163 to be located at a particular position along the hook appendage 157 that balances the loading position 166 of FIG. 14A with the constrained position 167 of FIG. 14B This allows for there to be sufficient length of the respective proximal portions 164 to attach to the hook member 37, but also allowing for sufficient freedom of the tail portions 103 to adequately separate during retrieval of the lure, thereby not requiring the user to slide the constraining element 163 into different positions. In such an embodiment, the constraining element 163 can be permanently affixed to the hook appendage 157 in such a desired position.

Figure 14D:
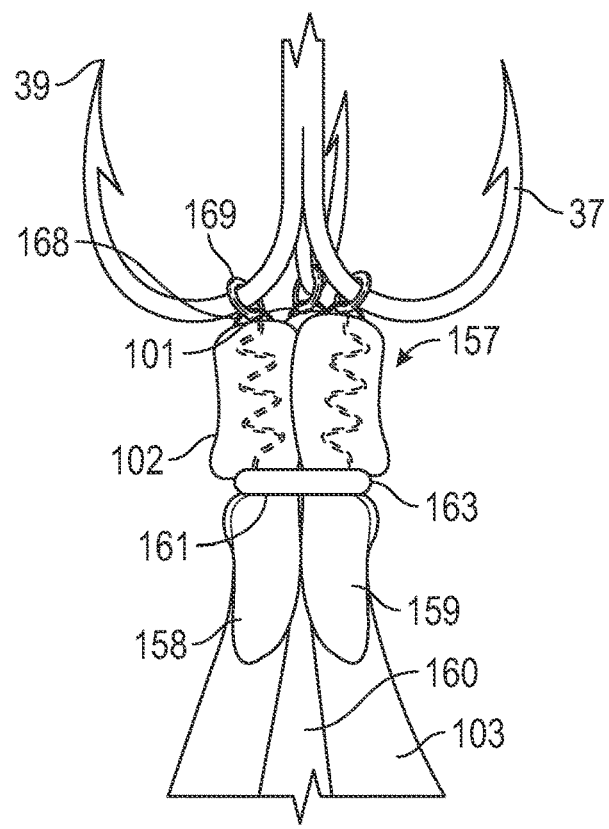
FIG. 14D is a side view of another embodiment of hook appendage.

In another embodiment of the hook appendage shown in FIG. 14d, the tail element 158,159,160 depicted includes screw-like tail attachment elements 101 (also known as 'hitchhikers' discussed in FIG. 8) partially embedded in the head 102 of proximal portion 164 thereof, the tail attachment element 101 providing a hooked end 168 to which a hook attachment element 169, such as the illustrative split ring is coupled. To prevent the hook attachment element 169 from uncoupling from the illustrative hitchhiker, the hitchhiker is screwed into the head 102 of the tail element 158 such that the open portion of the hooked end 168 is closed by the plastic of the tail element 158. Alternatively, the open end of the hooked end 168 may be directly secured over the hook and the tail element 158 rotated in an opposite direction of the winding of the tail attachment element 101 until the hooked end 168 is disposed within the head 102 to prevent uncoupling of the tail element 158. The open side of the hooked end 168 may be closed off within the head 102 such that soft plastic of the head 102 must be depressed and urged downward to temporarily expose the open side of the hooked end 168 until it can be coupled to the hook member 37. At that point, the soft plastic resiliently springs back and closes the open side of the hooked end 168. In the illustrative embodiment of FIG. 14D, there is a single groove 163 to receive the constraining element 163, located proximally within the proximal portion 164 in a configuration that cinches and draws together the heads 102 of the tail elements 158,159,160 closer to the shaft and places tension on the tail attachment element 101 so that they are less likely to become uncoupled from the arm of the treble hook element 37 to which they are attached. If a tail element (e.g., 158) is to be removed from the hook appendage 157 due to damage or other reasons, it can be slid through the constraining ring 163 proximally until sufficient slack is created to uncouple the hook attachment element 169 from the hook member 37. The hook appendage 157 can be reassembled by feeding the tail portion 103 of the replacement tail element distally through the constraining ring 163 until it can be coupled to the hook element 37 and the channel 161 of the tail element is aligned with the constraining ring 163 that is then seated therein. In addition to the illustrative tail attachment element 101, other structures such as eyes, loops, etc., made of metal, nylon or braided fishing line, or another material may be cast into or otherwise attached to the tail elements that are configured to attach over the hook terminal endpoints and on to the hook element to secure the tail elements thereto. In the case of wire or polymer loops that extend out of the tail elements along the proximal ends of the proximal portions thereof (rather than being embedded), the exposed loops can be placed over the terminal endpoints such that the tail portions so that the plastic of the tail element itself does not need to be pierced as in the embodiment shown in FIGS. 14A-B. Although not visible in FIG. 14D, the tail elements 158,159,160 may include a v-shaped inner surface 165 similar to that depicted in FIGS. 14A-C. In the illustrative embodiment of FIG. 14D, the proximal portions 164 of the tail elements 158,159,160 lack the multiple segments 162 and grooves 161 for allowing the constraining element 163 to be placed in different positions since the proximal portions 164 need not to be widely separated to attach the heads 102 thereof to the respective terminal endpoints 39 of the hook member 37. Rather, the proximal ends of distal tail portions 103 extend nearly to the constraining element 163 for maximum separation. It is within the scope of the invention for the three tail elements to be adhesively bonded, melted, or otherwise attached together without the constraining mechanism or integrally formed as long as the proximal head portions 164 can be sufficiently separated to be connected or impaled over the endpoints 39 of the hook member 37.

Those with ordinary skill in the art will appreciate that various modifications and alternatives for the described and illustrated examples can be developed in light of the overall teachings of the disclosure. Accordingly, the particular arrangements of elements and steps disclosed are intended to be illustrative only and not limiting as to the scope of the invention, which is to be given the full breadth of the appended claims and any and all equivalents thereof.

What is claimed is:

1. A fishing lure, comprising:
   a body portion having a first, proximal end, a second, distal end, a central longitudinal axis, a rotatable member, a hub, and an axial member extending therethrough along the central longitudinal axis, the rotatable member configured to rotate about the central longitudinal axis in the presence of fluid friction acting against the lure, the hub disposed about the second, distal end, within a recessed area formed into the rotatable member about the distal end of the body portion, wherein there is a circumferential space between the hub and the rotatable member, the hub further including a plurality of passageways extending therethrough that are configured to receive and orient a series of flexural elements that traverse and extend out of the hub about the distal end of the body portion in an array, each passageway of the plurality of passageways extending outwardly from the central longitudinal axis from a hub proximal end to a hub distal end, the array of the series of flexural elements collectively forming a generally conical shape;
   a hook member coupled to a junction region disposed distal of the body portion, the hook member having one or more terminal endpoints oriented in a proximal direction and maintained in general alignment with the central longitudinal axis by a constraining member disposed along the junction region, the one or more terminal endpoints defining a first lateral edge distance extending from the central longitudinal axis to the one or more terminal endpoints; and
   a shielding skirt extending from the body member, the shielding skirt comprising the array of the series of flexural elements, the array of the series of flexural element comprising a plurality of shielding elements attached to the hub, each shielding element of the plurality of shielding elements including a first, proximal end attached to the hub and a second, distal end comprising an outermost lateral edge defining a second lateral edge distance extending from the central longitudinal axis to the outermost lateral edge of each of the shielding elements, the shielding skirt extending outward from the body portion distally, the shielding skirt configured to assume a first configuration during retrieval of the lure that defines a protective zone within the shielding skirt capable of providing protection to the hook member from ensnaring submerged vegetation and selected other structure, the shielding skirt being sufficiently inwardly collapsible into a second configuration by contacting lateral forces, by a source such as a predator fish species, so that the one or more terminal endpoints of the hook member is/are exposed and available to ensnare the source of the contacting lateral forces, and wherein the shielding skirt resiliently returns to the first configuration when the lateral forces are removed;
   wherein the first lateral edge distance is less than the second lateral edge distance in the first configuration and greater than the second lateral edge distance in the second configuration.

2. The fishing lure of claim 1, wherein the rotatable member includes one or more helical channels formed into or within the body portion, the one or more helical channels having a deflecting surface that in the presence of fluid friction, causes the rotatable member to rotate in a predetermined direction.

3. The fishing lure of claim 1, wherein the rotatable member comprising one more blades having a deflecting surface that in the presence of fluid friction, causes the one or more blades of the rotatable member to rotate in a predetermined direction, the one or more blades being attached to a clevis with the axial member extending through the clevis.

4. The fishing lure of claim 1, wherein the plurality of shielding elements comprise coupled structures flexibly attached to at least selected ones of the second ends of the plurality of shielding elements.

5. The artificial lure of claim 1, wherein the hook member is attached to an end of the axial member or an intermediate structure disposed therebetween to form the junction region comprising a flexible coupling; the flexible coupling further comprising a constraining structure enclosing the flexible coupling that maintains the central shaft of the hook member in substantial continual alignment with the longitudinal axis absent external contact with the hook member, wherein the hook member is able to flex at the flexible coupling when lateral forces are applied and being able to return to substantial alignment with the longitudinal axis when the lateral forces are removed.

6. The artificial lure of claim 5, wherein the constraining structure comprises a sleeve comprising a heat shrink material.

7. The artificial lure of claim 1, wherein the shielding skirt comprises a soft plastic material, the shielding skirt having a plurality of flexible tail members extending therefrom and extending distal of the hook member to form a distal portion of the shielding skirt.

8. The artificial lure of claim 1, wherein the plurality of shielding elements are substantially comprised of a rigid or semi-rigid material, and wherein the hub is attached to the axial member.

9. The artificial lure of claim 8, wherein the series of flexural elements comprise a shape memory material.

10. The artificial lure of claim 8, wherein one or more of the shielding elements include a flexible tail extending from the second, distal end thereof, the flexible tail comprising a soft plastic material.

11. The artificial lure of claim 10, wherein the rotatable member further comprises vibration-generating structure that is activated to generate vibration with retrieval of the fishing lure.

12. The artificial lure of claim 10, wherein the body portion includes an internal cavity with one or more free elements that move about the internal cavity to cause vibrations that can emanate from the body portion.

13. The artificial lure of claim 8, wherein the series of flexural elements comprise a plurality of superelastic wires attached to the hub and extending distally at an angle to form the protective zone, and wherein the wires include a plurality of beads threaded thereover.

14. The artificial fishing lure of claim 1, further comprising an inner skirt disposed within the protective zone defined by the shielding skirt.

15. An artificial fishing lure, comprising:
a body portion having a proximal end, a distal end, a hub, a central longitudinal axis, the body portion further comprising an axial member coextending along the longitudinal axis, the body portion further comprising a rotatable member disposed about and extending outward from the central longitudinal axis, the rotatable member including one or more helical channels formed into or within the body portion, the one or more helical channels having a deflecting surface that in the presence of fluid friction, causes the routable member to rotate in a predetermined direction, wherein a recessed area formed into the rotatable member about the distal end of the body portion, the hub further including a plurality of passageways extending therethrough that are configured to receive and orient a series of flexural elements that traverse and extend out of the hub about the distal end of the body member in an array, each passageway of the plurality of passageways extending outwardly from the central longitudinal axis from a hub proximal end to a hub distal end, the array of flexural elements collectively forming a generally conical shape;
the axial member having a first end comprising a line attachment element and a second end having a distal attachment region, the axial member being disposed within and extending through a central channel formed within the rotatable member, the axial member sized such that the rotatable member is able to freely rotate therearound;
a hook member attached about the distal end of the body portion at a junction region located at the distal attachment region and having one or more terminal endpoints oriented in a proximal direction, the hook member being maintained in general alignment with the central longitudinal axis by a constraining member disposed along the junction region, the constraining member allowing for a flexible and resilient connection between the distal attachment region and the hook member, the one or more terminal endpoints defining a first lateral edge distance extending from the central longitudinal axis to the one or more terminal endpoints;
the hub attached to the axial member distal of the rotatable member, wherein there is a circumferential space between the hub and the rotatable member;
a shielding skirt attached to the body member, the shielding skirt comprising the array of the series of flexural elements, the array of the series of flexural elements comprising a plurality of discrete shielding elements each having a first and a second end, the shielding elements being attached to and extending outward from the hub while having sufficient rigidity and resiliency such that the shielding skirt assumes a first configuration protecting the hook member from ensnaring submerged vegetation and selected other structure, the first end of each of the shielding elements is attached to the hub, each of the shielding elements having an outermost lateral edge at the second end defining a second lateral edge distance extending from the central longitudinal axis to the outermost lateral edge of each of the shielding elements, while being sufficiently inwardly collapsible into a second configuration by sufficient lateral forces such that the one or more terminal endpoints of the hook member is/are exposed to allow a target predator species to become ensnared thereby, and wherein the shielding elements resiliently return to the first configuration when the lateral forces are removed, and wherein one or more of the shielding elements include an attachment region to which a coupled structure is flexibly attached;
wherein the first lateral edge distance is less than the second lateral edge distance in the first configuration and greater than the second lateral edge distance in the second configuration.

16. The artificial fishing lure of claim 15, wherein the attachment region includes a swivel element to which the coupled structure is attached.

17. The artificial fishing lure of claim 16, wherein the coupled structure includes a blade.

18. The artificial fishing lure of claim 17, wherein the coupled structure includes a soft plastic tail.

19. The artificial fishing lure of claim 15, further comprising an inner skirt disposed within the protective zone defined by the shielding skirt.

* * * * *